(12) United States Patent   (10) Patent No.: US 8,549,437 B2
Neubrand et al.             (45) Date of Patent:     Oct. 1, 2013

(54) DOWNLOADING AND SYNCHRONIZING MEDIA METADATA

(75) Inventors: Hans-Werner Neubrand, Cupertino, CA (US); Baskaran Subramaniam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 534 days.

(21) Appl. No.: 12/794,689

(22) Filed: Jun. 4, 2010

(65) Prior Publication Data

US 2011/0055765 A1    Mar. 3, 2011

Related U.S. Application Data

(60) Provisional application No. 61/237,678, filed on Aug. 27, 2009, provisional application No. 61/322,287, filed on Apr. 8, 2010.

(51) Int. Cl.
    *G06F 3/048*      (2013.01)

(52) U.S. Cl.
    USPC ............ 715/838; 715/202; 370/503; 370/464; 370/498; 709/248; 396/263; 396/187; 707/610

(58) Field of Classification Search
    USPC ......................................................... 715/838
    See application file for complete search history.

(56) References Cited

U.S. PATENT DOCUMENTS

| | | | |
|---|---|---|---|
| 6,209,048 B1 | 3/2001 | Wolff | |
| 6,282,362 B1 | 8/2001 | Murphy et al. | |
| 6,549,934 B1 | 4/2003 | Peterson et al. | |
| 6,704,819 B1 | 3/2004 | Chrysanthakopoulos | |
| 6,883,146 B2 | 4/2005 | Prabhu et al. | |
| 7,149,366 B1 | 12/2006 | Sun | |
| 7,333,725 B1 * | 2/2008 | Frazier | 396/263 |
| 7,430,003 B2 | 9/2008 | Nichols et al. | |
| 7,508,419 B2 | 3/2009 | Toyama et al. | |
| 7,518,650 B2 | 4/2009 | Miyamoto | |
| 7,546,353 B2 | 6/2009 | Hesselink et al. | |
| 7,587,467 B2 | 9/2009 | Hesselink et al. | |
| 7,725,431 B2 * | 5/2010 | Myllyla et al. | 707/610 |
| 2003/0191848 A1 | 10/2003 | Hesselink et al. | |
| 2004/0070670 A1 | 4/2004 | Foster | |
| 2005/0114711 A1 | 5/2005 | Hesselink et al. | |
| 2005/0120082 A1 | 6/2005 | Hesselink et al. | |
| 2006/0187317 A1 | 8/2006 | Montulli et al. | |
| 2007/0073937 A1 | 3/2007 | Feinberg et al. | |
| 2007/0115373 A1 | 5/2007 | Gallagher et al. | |
| 2007/0189333 A1 * | 8/2007 | Naaman et al. | 370/477 |

(Continued)

OTHER PUBLICATIONS

Screenshot of Nikon Transfer 1.1.0 software manufactured by Nikon, Published on May 29, 2008, 14 pages.*

(Continued)

*Primary Examiner* — William Bashore
*Assistant Examiner* — Reza Nabi
(74) *Attorney, Agent, or Firm* — Novak Druce Connolly Bove + Quigg LLP

(57) ABSTRACT

For a first device, some embodiments provide an application for displaying several media content stored on a second device communicably connected to the first device. The application includes a graphical user interface ("GUI"). The GUI includes a media content display area for displaying the media content stored on the second device. The GUI includes a selectable item for activating a synchronization feature that automatically modifies a clock of the second device to match a clock of the first device.

18 Claims, 22 Drawing Sheets

(56) References Cited

U.S. PATENT DOCUMENTS

| | | |
|---|---|---|
| 2007/0199033 A1 | 8/2007 | Nakagawa et al. |
| 2007/0206101 A1 | 9/2007 | Ueno et al. |
| 2007/0209023 A1 | 9/2007 | Nakagawa et al. |
| 2007/0244925 A1 | 10/2007 | Albouze |
| 2007/0250232 A1 | 10/2007 | Dourney, Jr. et al. |
| 2007/0284450 A1 | 12/2007 | Nelson |
| 2008/0005184 A1* | 1/2008 | Myllyla et al. ............. 707/200 |
| 2008/0117309 A1 | 5/2008 | Jeon |
| 2008/0212672 A1* | 9/2008 | Ahn et al. ............. 375/240.01 |
| 2009/0106454 A1* | 4/2009 | Girle et al. ............. 709/248 |
| 2009/0115852 A1 | 5/2009 | Jung et al. |
| 2009/0234850 A1* | 9/2009 | Kocsis et al. ............. 707/6 |
| 2009/0248713 A1* | 10/2009 | Park et al. ............. 707/100 |
| 2010/0042682 A1* | 2/2010 | Kaye ............. 709/203 |
| 2010/0070643 A1* | 3/2010 | Puranik et al. ............. 709/231 |
| 2010/0088297 A1* | 4/2010 | Kiilerich et al. ............. 707/705 |
| 2010/0223230 A1* | 9/2010 | Nardone et al. ............. 707/610 |
| 2012/0198317 A1* | 8/2012 | Eppolito et al. ............. 715/202 |

OTHER PUBLICATIONS

Working Screenshot of Nikon Transfer 1.1.0 Software manufactured by Nikon, Published on May 29, 2008, 14 pages.*

U.S. Appl. No. 10/873,822, filed Jun. 22, 2004, Neubrand, Hans-Werner, et al.

U.S. Appl. No. 12/479,851, filed Jun. 7, 2009, Neubrand, Hans-Werner.

U.S. Appl. No. 12/479,853, filed Jun. 7, 2009, Neubrand, Hans-Werner.

U.S. Appl. No. 12/479,854, filed Jun. 7, 2009, Neubrand, Hans-Werner.

* cited by examiner

DOWNLOADING AND SYNCHRONIZING MEDIA METADATA

CLAIM OF BENEFIT TO PRIOR APPLICATIONS

This application claims benefit to U.S. Provisional Patent Application No. 61/237,678 entitled "Downloading and Synchronizing Media Metadata", filed Aug. 27, 2009. This application also claims benefit to U.S. Provisional Patent Application No. 61/322,287 entitled "Downloading and Synchronizing Media Metadata", filed Apr. 8, 2010. U.S. Provisional Patent Applications No. 61/237,678 and 61/322,287 are hereby incorporated by reference.

BACKGROUND

In addition to storing an image file when taking a picture, some digital cameras also store metadata for the picture. This metadata may include a thumbnail (i.e., small, low-resolution version) of the picture, geolocation coordinates indicating where the picture was taken, and a timestamp indicating when the picture was taken.

In order to timestamp the picture, some digital cameras include internal clocks that keep track of the time and/or date. The time and date at the time a picture is taken are then saved as the timestamp for that picture. However, there is no guarantee that the time and date of a camera will actually be set correctly. If the time and/or date is incorrect, then the timestamp of a picture will be incorrect.

An incorrect time and date may be a problem if the image file is later transferred to a computer or other device. For example, if images on the computer also come from a different camera with a correct time and date, then the images with the incorrect time and date may be out of order.

BRIEF SUMMARY

Some embodiments of the invention provide a novel synchronization feature for a media capture application. The synchronization feature of some embodiments adjusts an internal clock of a media capture device (e.g., a camera) so that the time and date of the internal clock is the same as that of a clock of the device on which the image capture application operates (e.g., a computer). In some embodiments, media content (e.g., images, videos, audio, etc.) downloaded from the media capture device is timestamped, and these timestamps are modified as well in accordance with the modification to the clock.

In some embodiments, the media capture application includes a graphical user interface ("GUI"). The GUI of some embodiments includes a first display area for displaying a menu of available media capture and storage devices. The menu allows a user to select a particular device from among the devices displayed in the first display area. In some embodiments, when a user selects a particular device in the first display area, the GUI displays media files and/or metadata about the media files (e.g., the timestamps) in a second display area. A third display area displays GUI items for controlling the particular device.

The GUI items include a synchronization button in some embodiments. Upon a selection of the synchronization button by a user, the synchronization feature described above is initiated. That is, when the user clicks (or touches, if using a touchscreen) the synchronization button, the media capture application adjusts the time and date of a selected media capture device, and also adjusts the timestamps of media files downloaded from the selected device.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed.

DETAILED DESCRIPTION

Figure 1:
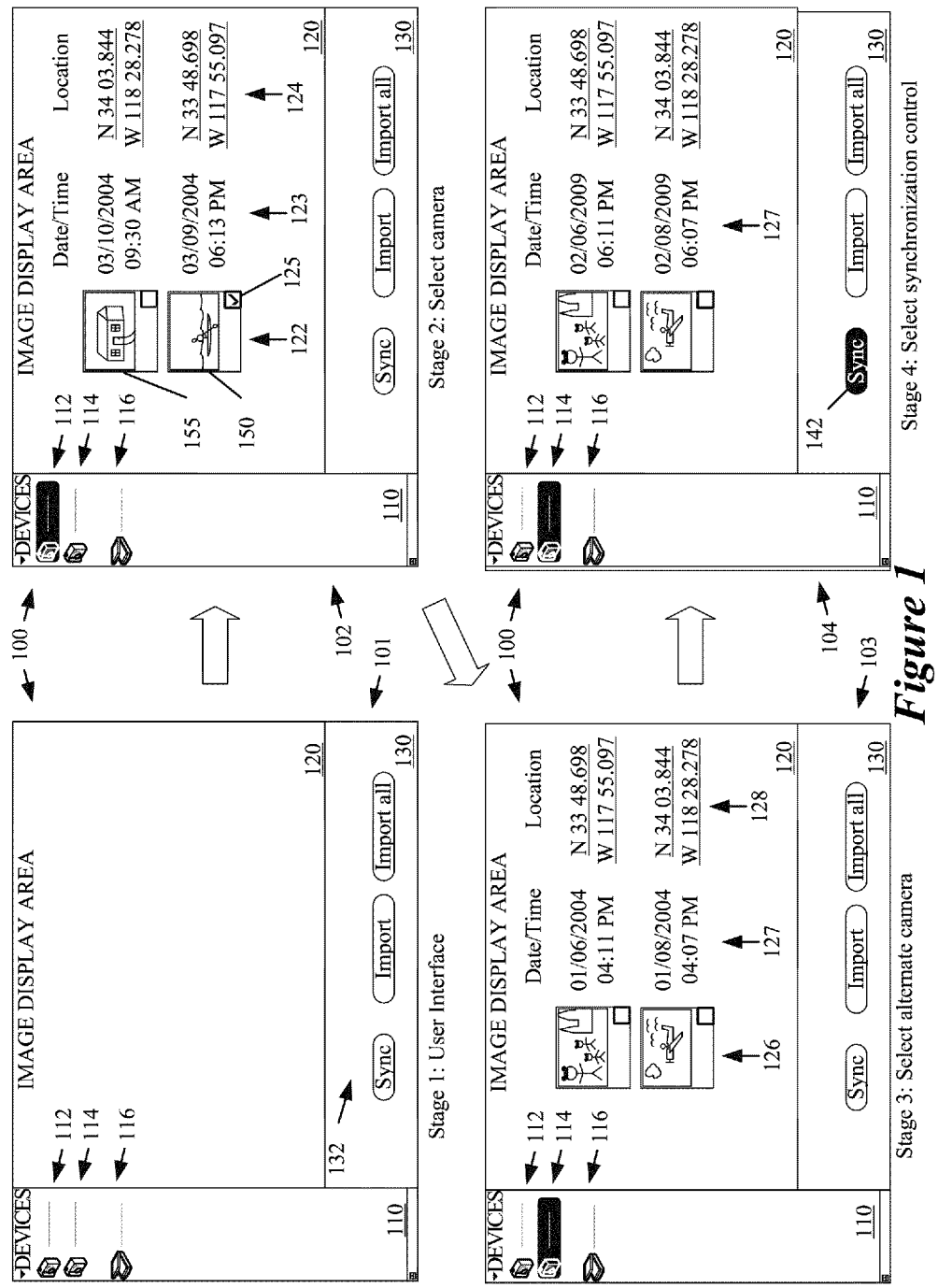
FIG. 1 illustrates an example of an image capture application GUI of some embodiments that performs temporal synchronization.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed. For instance, many of the descriptions below refer specifically to images, image capture devices, and image capture applications. One of ordinary skill in the art will recognize that many of the features described are equally applicable to other media, such as video or audio.

Some embodiments of the invention provide a media capture application (e.g., image capture application) that manages multiple different media storage devices and media capture devices (often referred to herein collectively as either media storage devices or media capture devices) from multiple different manufacturers. The media capture application of some embodiments detects one or more media storage devices connected to a computing device (e.g., computer, smartphone, etc.) on which the media capture application operates. In some embodiments the media capture application also detects media storage devices that are shared on a network (e.g., a local area network) to which the computing device is connected. The media capture application of some embodiments detects multiple types of devices, including scanners, cameras, and memory devices that store images. Some embodiments manage multiple types of devices (e.g., cameras and scanners), while other embodiments manage only a single type of device (e.g., cameras only).

In some embodiments, the media capture application includes a graphical user interface ("GUI"). The GUI of some embodiments includes a first display area for displaying a menu of the available media storage devices. The menu allows a user to select a particular device from among the one or more devices displayed in the first display area. In some embodiments, when a user selects a particular media storage device in the first display area, the GUI displays information regarding the media content stored on the particular device in a second display area. This information may be metadata about the media content in some embodiments. Metadata, in some embodiments, is information about data (e.g., a file) that is not part of the content of the file. For instance, when the media content includes image files, the displayed metadata may include one or more of thumbnails of the image files, location data for the image files, and timestamps for the image files. Different media content may have similar or different metadata. Metadata may be stored with a particular file and automatically copied with the file in some embodiments. Some embodiments may also store metadata separately from the file with which it is associated. Some devices are be unable to store metadata at all, in which case metadata associated with a file may be lost if transferred to such a device.

When a user selects a particular media storage device, some embodiments also display controls for the particular device in a third display area. That is, the GUI of some embodiments simultaneously displays (i) the menu of one or more media storage devices, (ii) media content and/or metadata stored on the selected media storage device, and (iii) controls for the selected media storage device. The controls allow the user to command the media capture application to take various actions that affect the selected media storage device and/or media files (e.g., image files, video files, audio files, etc.) stored on the device.

One such control activates a synchronization function for adjusting an internal clock of a media capture device (e.g., a camera) so that the time and date is the same as that of the clock on the device on which the media capture application operates. In some embodiments, pieces of media content (e.g., image files) downloaded from the media capture device are timestamped, and these timestamps are modified as well in accordance with the modification to the clock. That is, if the synchronization function moves the internal clock of a camera forward by six hours, the timestamps of any photos downloaded from the camera are also moved forward by six hours.

FIG. 1 illustrates an example of an image capture application GUI 100 of some embodiments that performs such temporal synchronization. FIG. 1 illustrates the GUI 100 providing different controls and images at various stages when various media capture devices (in this example, image capture devices) are selected. Specifically, this figure illustrates the GUI 100 at four different stages: (1) a first stage 101 before any image storage device is selected; (2) a second stage 102 after the selection of a first camera; (3) a third stage 103 after the selection of a second camera; and (4) a fourth stage 104 after the activation of a synchronization control. One of ordinary skill in the art will recognize that the individual stages can be reached in any order, and there is no requirement that the stages appear in the order illustrated in FIG. 1.

As shown in FIG. 1, the GUI 100 includes device display area 110, image display area 120, and control area 130. The device display area 110 displays a menu of image capture devices that are available to the image capture application. In this example, three image capture devices are represented in the menu by icons 112, 114, and 116. The image display area 120 displays thumbnails and other metadata for images stored on a selected image capture device (e.g., images stored on a camera). In some embodiments, the image display area displays the full size images stored on the image capture device instead of or in addition to the metadata. The control area 130 displays GUI items for controlling image capture devices and functions of the image capture application that relate to such devices. These GUI items include a synchronization button 142 for synchronizing the internal time and date of a selected device with the clock of the device on which the image capture application operates.

The operation of the GUI 100 will now be described by reference to the state of the GUI 100 during the four stages 101-104. Stage 101 illustrates the GUI 100 after the image capture application has detected three available image capture devices and populated the menu in device display area 110 with the detected devices. As shown, the device display area 110 displays icons 112 and 114, which each represent a different detected camera, and icon 116, which represents a detected scanner. These devices may be connected directly to the device on which the image capture application operates (e.g., through a USB port, wireless connection, etc.) or may be a shared device on a network to which the device running the image capture application is also connected.

At this stage, none of the icons are selected and thus the image display area 120 is empty. As shown in stage 101, when no device is selected the GUI 100 displays a default set of camera controls 132 in the control area 130 in some embodiments. Some embodiments display scanner (or other device) controls rather than camera controls as the default controls in control area 130. However, in some embodiments, these controls (whether camera or scanner controls) are inactive when no device is selected. In other embodiments, when no device is selected no default controls are displayed and the control area 130 is blank.

Stage 102 illustrates the GUI 100 when a first camera icon 112 is selected. This selection is shown by the inverted colors of the icon 112, though different embodiments use different visual indications to indicate a selection (e.g., highlighting a contour of the icon, etc.). As a result of the selection, the image capture application retrieves metadata from the selected camera and displays the metadata in the image display area 120. The metadata relates to the individual image files stored on the camera. The metadata of some embodiments includes (1) thumbnail representations 122 of the image files stored on the selected camera, (2) temporal data 123 (i.e., dates and times) that indicates when each picture on the camera was taken, and (3) geographical location data 124 (e.g., longitude and latitude) that indicates where each picture on the camera was taken.

In some embodiments, the thumbnails 122 are small, low resolution representations of the images in the image files stored on the camera. The thumbnails are generated from the image by the camera in some embodiments, while in other embodiments the thumbnails are generated by the device on which the image capture application operates. In some embodiments, selecting the location metadata 124 for an image opens a map that shows the area around the location at which the image was taken. The image display area 120 also displays a checkmark 125, which indicates that the image file represented by the marked thumbnail 150 has been downloaded from the camera to the device on which the image capture application operates. On the other hand, no checkmark is displayed for thumbnail 155, indicating that the image represented by this thumbnail has not been downloaded.

Stage 103 illustrates the GUI 100 when a second camera icon 114 is selected (as indicated by its inverted colors). As a result of the selection, the image capture application has retrieved metadata from the camera associated with the selected icon 114 and displayed this metadata in image display area 120. This metadata also includes (1) thumbnail representations 126 of the image files stored on the second camera, (2) temporal data 127 (i.e., dates and times) that indicates when each picture on the camera was taken, and (3) geographical location data 128 (e.g., longitude and latitude) that indicates where each picture on the camera was taken. This new metadata are the same types of metadata as displayed at stage 102, but the content of this new metadata is different because different image files taken at different times and locations are stored on the second camera.

Stage 104 illustrates the selection of synchronization control 142, a GUI item for activating a synchronization function of the image capture application. When the synchronization control 142 of some embodiments is activated, it synchronizes the time and date of the selected camera's internal clock with the time and date of the clock on the device on which the image capture application operates. In some embodiments, the synchronization control 142 also causes the image capture application to adjust the timestamps (e.g., temporal data 127) of some or all of the image files downloaded from the camera and/or stored on the camera in accordance with the change in the internal clock. This is illustrated by the change of the date and time in temporal data 127 from stage 103 to stage 104 after the user has selected synchronization control 142.

The temporal data adjusted by the synchronization feature is one example of metadata about the image files stored on the image capture device. In some embodiments, the image capture application can read and adjust such metadata without downloading the image files with which the metadata is associated. In fact, in some embodiments, different types of metadata can be retrieved independently of other types of metadata. For example, some embodiments can synchronize a camera clock and timestamps of image files stored on the camera without downloading any of the image files or retrieving thumbnails of the images.

Several more detailed embodiments of the invention are described in the sections below. Section I describes the synchronization function for synchronizing computer and image capture device times. Section II then describes a download indicator that indicates whether a particular image file has been downloaded to a computer from a connected device. Section III next describes a feature that enables the image capture application to plot images on a map based on location metadata without importing the images. Section IV describes the software architecture of the image capture application of some embodiments, while Section V describes a process for defining an image capture application. Finally, Section VI describes an electronic system with which some embodiments of the invention are implemented.

I. Time and Date Synchronization

As noted above, the image capture application of some embodiments provides a synchronization feature for adjusting the time and date of an internal clock of an image capture device (e.g., a camera) to match the time and date of the computing device on which the image capture application operates. The synchronization feature of some such embodiments also adjusts timestamps of one or more images downloaded from and/or stored on the camera in order to account for the difference between the time and date of the internal clock of the camera and the time and date of the clock of the computing device on which the image capture application operates.

Figure 2:
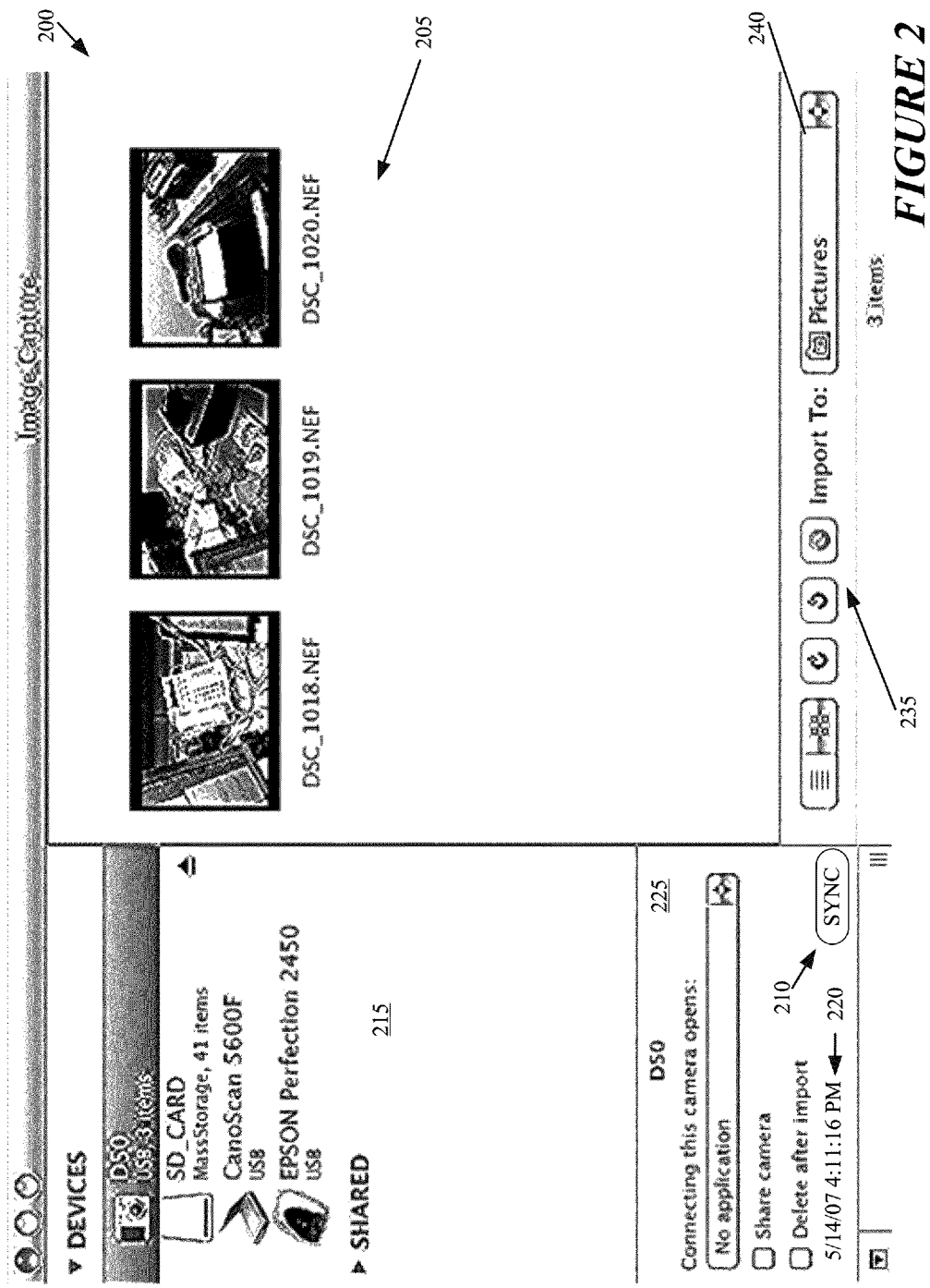
FIG. 2 illustrates a of an image capture application of some embodiments with a camera clock synchronization tool.

FIG. 2 illustrates a GUI 200 of an image capture application of some embodiments with such a camera clock synchronization tool. Much like GUI 100, The GUI 200 includes an image display area 205 and device display area 215. The controls in the GUI are split between a device control area 225 and an image control area 235. Image display area 205 and device display area 215 are similar to the corresponding display areas described with respect to FIG. 1. Device display area 215 displays devices connected to the computer on which the image capture application operates. In the example of FIG. 2, four devices are connected to the computer: a camera, which is presently selected, a SD card, a scanner, and a photo scanner. Different icons are used to represent the different types of devices. These devices may be either connected directly to the computer or connected to the same network as the computer. The device display area also has a section for shared devices (i.e., devices that another user has made publicly available to other computers on the network), though no such devices are shown in FIG. 2.

The image display area 205 displays image file names and thumbnails of images stored on the selected device. In this case, the selected device is a camera, as shown in device display area 215. Unlike in FIG. 1, the image display area 205 does not display other metadata regarding the image files (e.g., timestamps, geolocations, etc.).

The device control area 225 displays various controls for a selected device. As shown in FIG. 2, Options are provided to share the camera on a network and delete image files on the camera after the files are imported by the image capture application. The device control area also includes a synchronization button 210 and a clock 220 that displays the time on the internal device clock of the selected device. As described, the synchronization feature allows a user to change the device clock to match that of the computer on which the image capture application operates. In some embodiments, the computer clock is also displayed in the GUI of the image capture application. In some cases, the computer clock is displayed in the GUI of the operating system of the computer (e.g., in the bottom right corner, top right corner, top center, etc.).

In some embodiments, different controls are displayed in the device control area 225 when a device other than a camera is selected. For instance, when an SD card is selected, some embodiments do not display a synchronization function because SD cards generally do not keep an internal time. Similarly, when a scanner is selected, some embodiments do not display an option to delete files after import because files are generally not stored on a scanner. However, other controls for managing the selected scanner might be displayed when a scanner is selected in device display area 215. Image capture applications of some embodiments for managing scanners, and the GUIs used therein, are described in U.S. patent application Ser. No. 12/479,853, filed Jun. 7, 2009, which is incorporated herein by reference.

The image control area 235 includes various controls relating to the images stored on or imported from a selected device. For example, the image control area 235 includes a drop-down menu that allows a user to determine to which folder on the computer images from the selected device will be imported. In some embodiments, the image control area also includes an import button for initiating the import of images from the selected device. The image control area also includes display controls, such as the option to display the images in thumbnail view (as shown) or to switch to a list of image file names, options to rotate selected images, etc.

Figure 3:
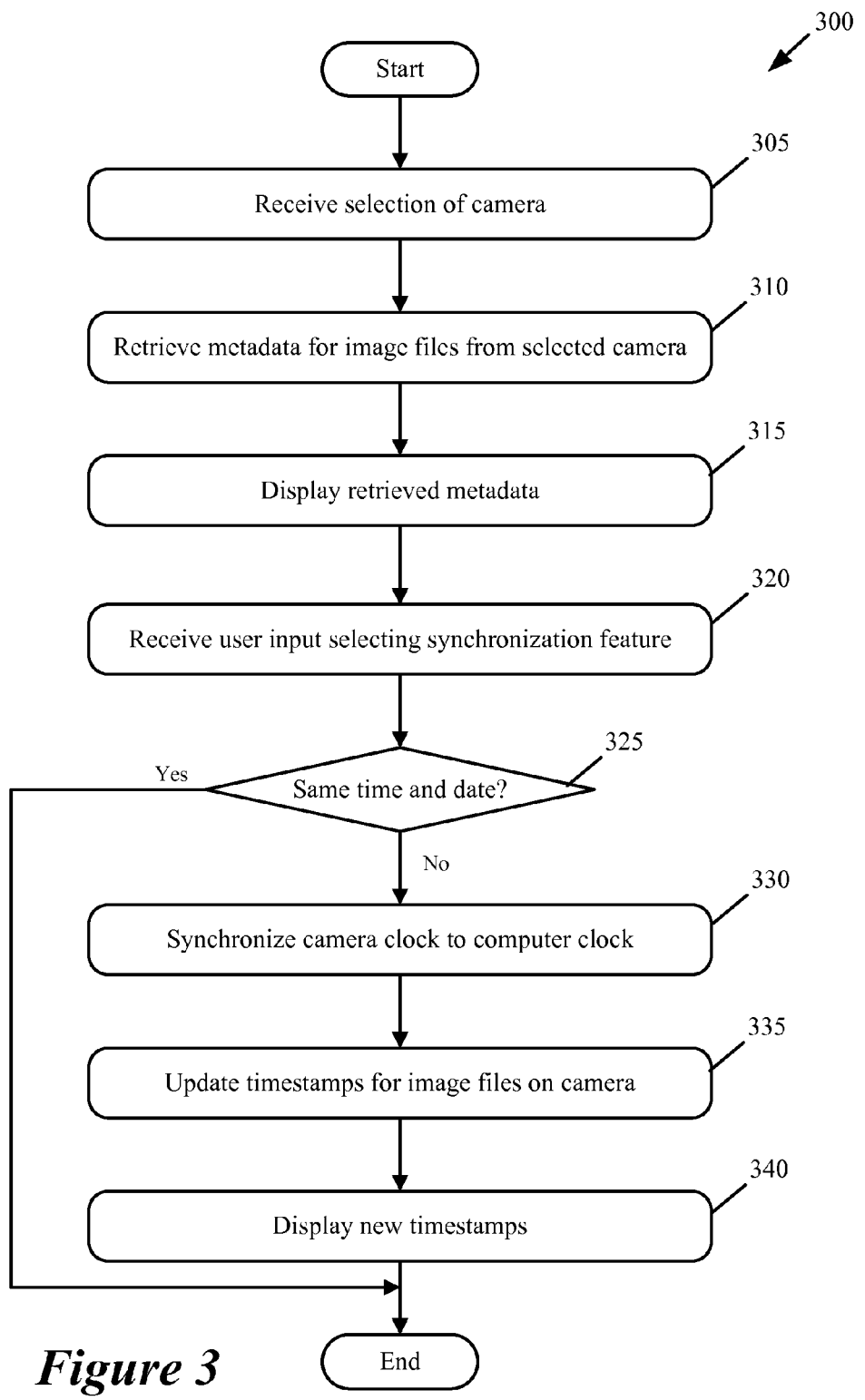
FIG. 3 conceptually illustrates a process of some embodiments for commanding a camera clock to synchronize with the clock of a computing device on which an image capture application is running.

FIG. 3 conceptually illustrates a process 300 of some embodiments for commanding a camera clock to synchronize with the clock of a computing device on which an image capture application is running In some embodiments, this process is performed, at least in part, by the image capture application. The process 300 will be described by reference to FIGS. 4 and 5, as well as FIG. 6.

Figure 4:
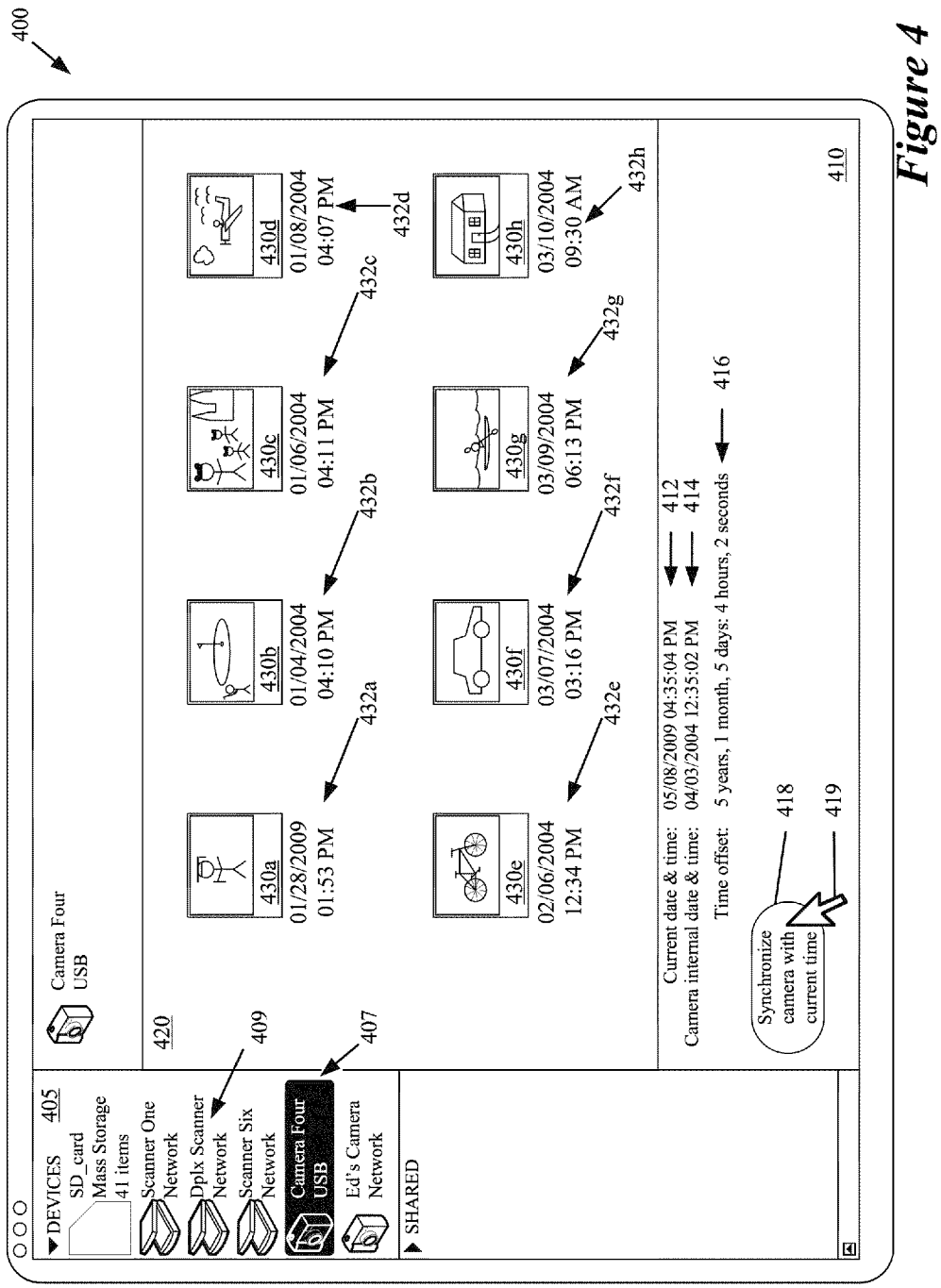
FIGS. 4 and 5 illustrate the effect of the synchronization process of FIG. 3 on a graphical user interface of an image capture application of some embodiments.
Figure 5:
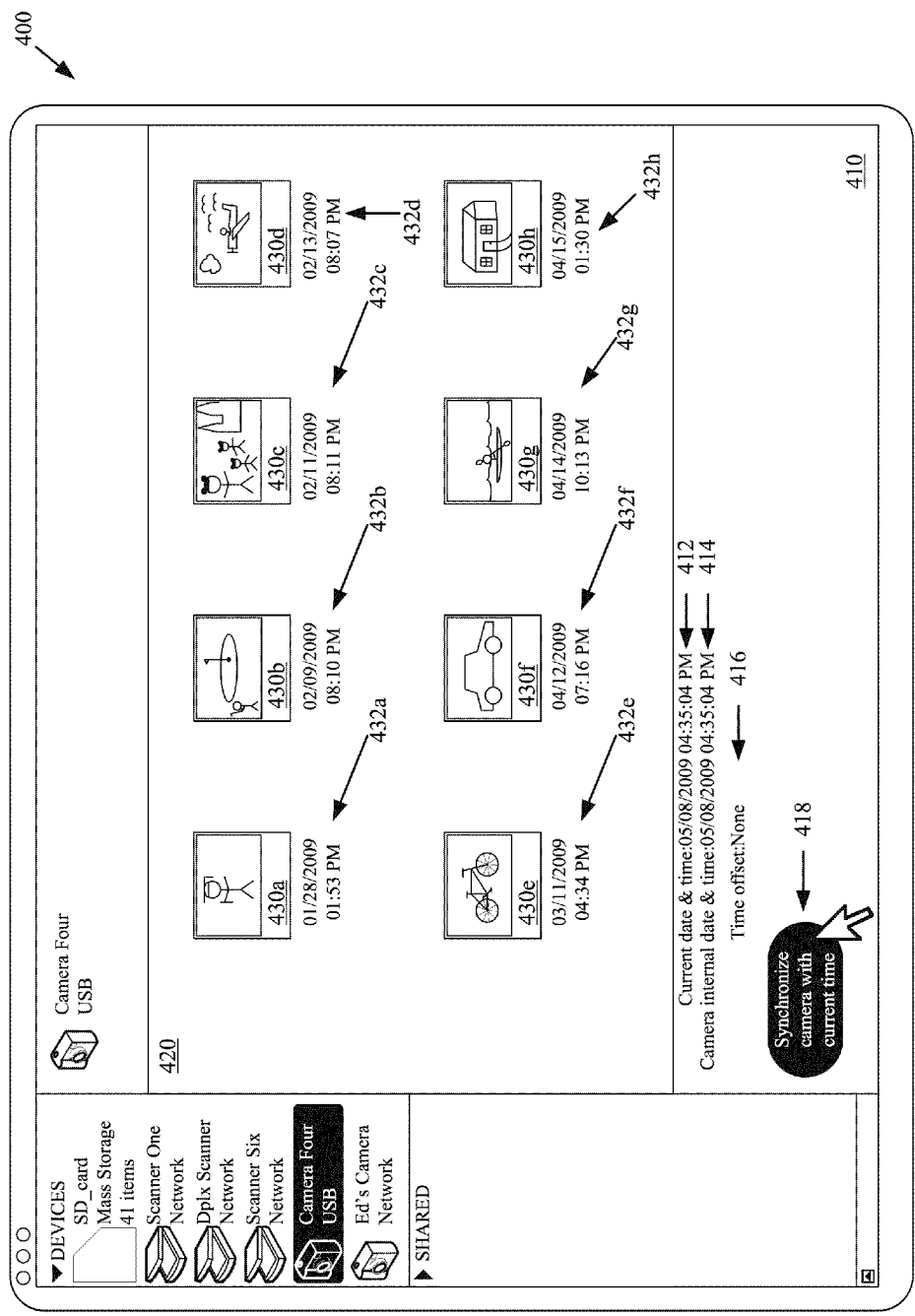

FIGS. 4 and 5 illustrate the effect of synchronization process 300 on a graphical user interface 400 of an image capture application of some embodiments. Like the GUI 100 illustrated in FIG. 1, the GUI 400 includes a device display area 405, a controls area 410, and an image display area 420. The menu in the device display area lists six devices connected to the computer. Some of these devices (e.g., the selected camera represented by icon 407) are connected directly to the computer while other devices are connected to a network to which the computer is also connected (e.g., the scanner represented by icon 409).

The controls area 410 includes a synchronization button 418 for activating the synchronization feature. The controls area 410 also displays information regarding the current date and time 412 according to the computing device, the internal date and time 414 of the selected camera and the temporal offset 416 between these two. As shown, the times between the two device clocks are offset by over five years.

The image display area 220 displays thumbnails 430a-h of images stored on the selected camera as well as other metadata about the image files. Specifically, image display area 420 displays timestamps for each of the image files below the respective thumbnails. As illustrated by GUIs 100, 200, and 400, different embodiments provide different GUI displays. In some embodiments, a user of the image capture application can customize the GUI or at least choose between multiple options for the appearance (e.g., between the three options of GUIs 100, 200, and 400).

Figure 6:
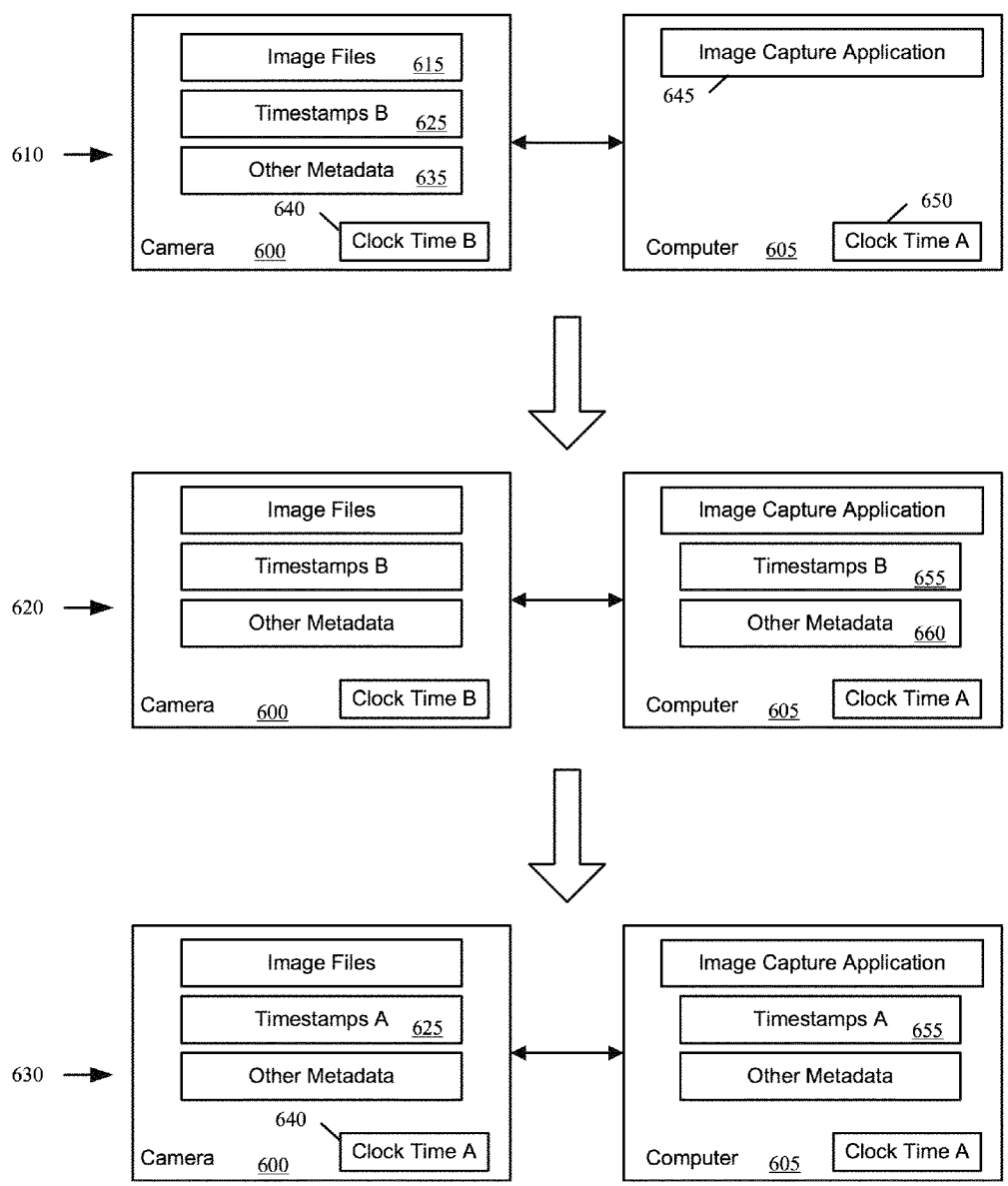
FIG. 6 illustrates information stored on a camera and computer to which the camera is connected.

FIG. 6 illustrates information stored on a camera 600 and computer 605 to which the camera is connected. Specifically, FIG. 6 illustrates three stages: a first stage 610 before any metadata is retrieved from the camera 600, a second stage 620 after the metadata is retrieved, and a third stage 630 after a synchronization operation of some embodiments is performed.

Returning to FIG. 3, the process 300 begins by receiving (at 305) a selection of a camera. In some embodiments, a user selects a camera from the device display area (e.g., area 405). This selection may come by the way of a user moving a cursor with a cursor controller such as a mouse, tablet and stylus, touchpad, trackpad, etc., and then providing selection input through the cursor controller (e.g., clicking a mouse button, tapping a touchpad, etc.). In some embodiments, the GUI is displayed on a touchscreen, and the user touches one of the device icons in the device display area to select the icon. As shown in FIG. 4, "Camera Four" has been selected by way of device icon 407.

As illustrated at stage 610 of FIG. 6, the camera 600 (which could be, e.g., "Camera Four") stores image files 615, timestamps 625, and other metadata 635. The camera also has an internal clock 640 set to time B. The computer 605 includes image capture application 645 (e.g., the image capture application whose GUI is illustrated in FIGS. 4 and 5), as well as an internal clock 650 set to time A.

The process 300 then retrieves (at 310) any metadata for image files stored on the selected camera from the camera. In some embodiments, the image capture application is able to retrieve metadata (e.g., thumbnails, location information, timestamps, etc.) about image files from a camera or other device without actually retrieving the image files themselves. The process 300 then displays (at 315) the retrieved metadata in the GUI of the image capture application. As mentioned, different embodiments display different metadata. Which metadata is displayed may depend on user preferences, the metadata that is available (e.g., not all image files will have timestamps, location information, etc.), and the metadata that is recognizable to the image capture application. As shown in FIG. 4, thumbnails 430a-h and timestamps 432a-h are displayed in image display area 420 of GUI 400.

Stage 620 of FIG. 6 illustrates that the timestamps 625 and other metadata 635 are now duplicated on the computer 605 as timestamps 655 and metadata 660. This is the result of the image capture application 645 retrieving this data from the camera 600. In stage 620, both the timestamps on the camera and the computer are based on the clock 640 of the camera.

Next, the process 300 receives (at 320) user input selecting the synchronization feature. In some embodiments, this involves selecting a UI item such as synchronization button 418 that activates the synchronization feature. As with the selection of a device, this selection may be by the way of a cursor controller (e.g., mouse, touchpad, trackpad, etc.), a touchscreen, or other selection mechanism (e.g., a keyboard). FIG. 4 illustrates that a cursor 419 is placed over the synchronization button 418. By clicking on a mouse, tapping a touchpad, etc., a user can now select the synchronization button 418.

When the synchronization feature is selected, the process determines (at 325) whether the computer running the image capture application and the selected camera have the same time and date. When the time and date are the same on the two devices, there is no need to update the camera clock or modify the timestamps, so the process ends.

However, when the time and date are not the same, the process synchronizes (at 330) the camera clock to match the computer clock. In some embodiments, the image capture application sends a command to the camera to modify its clock. As illustrated in FIG. 5, after a user has selected synchronization button 418, the displayed camera time and date 414 is now the same as the computer time and date 412, and the time mismatch 416 is zero. In the example shown, the camera clock is moved forwards in time. However, some embodiments can also set the camera clock backwards when the clock is set in the future (e.g., if the camera clock were set to 2014 rather than 2004).

The process 300 also updates (at 335) the timestamps for the image files on the camera. In some embodiments, the timestamps for all of the image files on the selected camera are modified by the same amount of time as the camera's clock. However, in some embodiments, the time stamps are only updated when doing so would not move the timestamp for an image file into the future (i.e., ahead of the computer clock). Some embodiments modify both the timestamps on the camera as well as the retrieved time stamps that are stored on the computer (e.g., in RAM, on a hard disk, etc.).

The process displays (at 340) the new timestamps (e.g., in image display area 420). In the situation displayed in FIGS. 4 and 5, the time gap between the camera and the computer is five years, one month, five days, four hours, and two seconds. However, because the timestamp 432*a* is initially Jan. 28, 2009 at 1:53 PM, moving this timestamp forward by 5+ years would move it well into the future, at a time when the image could not have been taken by the camera. Accordingly, as will be described in further detail below with respect to FIG. 7, some embodiments check each timestamp for the viability of modification before updating the timestamp. As displayed in FIG. 5, the selection of synchronization button 418 has caused the timestamps 432*b-h* to all be modified by the time gap between the two devices (i.e., moved forward 5+ years). After updating the clock and timestamps and modifying the display, the process then ends.

Stage 630 of FIG. 6 illustrates the result of the synchronization operation. The device clock 640 on the camera is now changed to time A, that of the computer clock 650. Furthermore, both the timestamps 655 on the computer and the timestamps 625 on the camera have been modified by the image capture application's synchronization operation.

Figure 7:
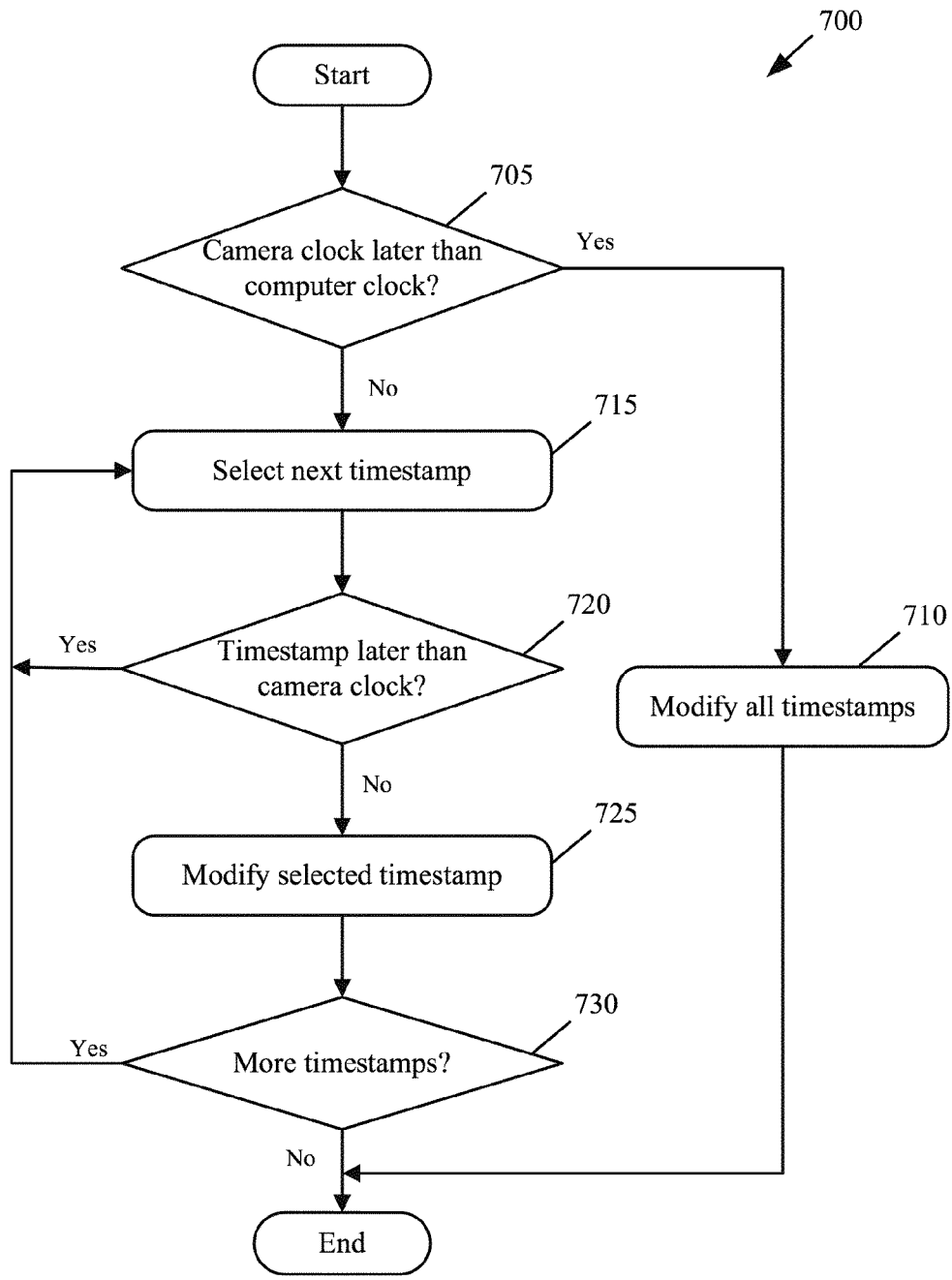
FIG. 7 conceptually illustrates a process of some embodiments for updating timestamps in response to a selection of a synchronization feature.

As mentioned above, the image capture application of some embodiments will not necessarily update all of the timestamps automatically. Specifically, when moving timestamps forward, some embodiments will avoid moving timestamps into the "future". That is, the timestamps will not be moved past the current time according to the computing device on which the image capture application operates. FIG. 7 conceptually illustrates a process 700 of some embodiments for updating timestamps (e.g., timestamps downloaded from the camera) in response to a selection of a synchronization feature. In some embodiments, process 700 is performed at operation 335 of process 300. The process 700 may also be performed as images or other timestamped media files are imported from a camera in some embodiments. That is, when the images are imported, the image capture application of some embodiments automatically checks for a clock discrepancy and updates the timestamps of the image files.

As shown, the process begins by determining (at 705) whether the camera's internal clock (before being modified by the synchronization operation) is later than the computer clock. When the camera clock is later than the computer clock, timestamps will be moved backwards in time rather than forward. In this case, there is no need to check whether the timestamps will be moving into the future. If timestamps are set ahead of the camera clock, then they will remain in the future (as compared to the computer clock) when modified, and will likely be wrong in either case. As such, the process modifies (at 710) all of the timestamps, then ends. Some embodiments, however, leave the timestamps alone if they will still be set ahead of the computer clock after modification.

On the other hand, when the camera clock is earlier than the computer clock, the process will move the timestamps forward in time. The process thus selects (at 715) a timestamp. In some embodiments, the timestamps are ordered by time or some other factor, while in other embodiments the timestamps are selected randomly. Once a timestamp is selected, the process determines (at 720) whether the selected timestamp is later than the camera clock. When the timestamp is later than the camera clock, the image file to which it corresponds could not have been captured by the camera while the clock was at its current setting. As such, there is a possibility that the timestamp is actually accurate. Furthermore, modifying the timestamp would push the time past the current time (assuming the computer time is correct). As such, the process does not modify the timestamp and returns to 715 to select the next timestamp.

When the timestamp is not later than the camera clock, however, the process modifies (at 725) the selected timestamp by adding to it the difference between the camera clock and the computer clock. The process then determines (at 730) whether more timestamps remain to be modified. When more timestamps remain, the process returns to 715 to select the next timestamp. Otherwise, the process ends.

In FIG. 5, the timestamps 432*b-h* are all modified by five years, one month, five days, four hours, and two seconds because these timestamps are from times prior to the camera's internal clock. Most likely these images were taken while the camera clock was set incorrectly. However, timestamp 432*a* is not modified. This is because the timestamp indicates that the image was taken in 2009, well after the camera's current internal date and time. In such a situation, the camera may have been set to the correct date and time when the image was taken and then later set incorrectly.

Some embodiments provide further user control over the timestamp updates. For example, some embodiments provide options for applying timestamp updates to only user-selected image files, or options for excluding user-selected files from timestamp updates. There might be user-selectable checkboxes next to the thumbnails or timestamps enabling a user to select files that should be updated or excluded from an update. Some embodiments provide an upper or lower boundary for the difference between the clocks that will cause timestamp updates (e.g., if the difference is less than 5 seconds, the camera clock will synchronize to the computer clock, but the timestamps will not be adjusted).

Figure 8:
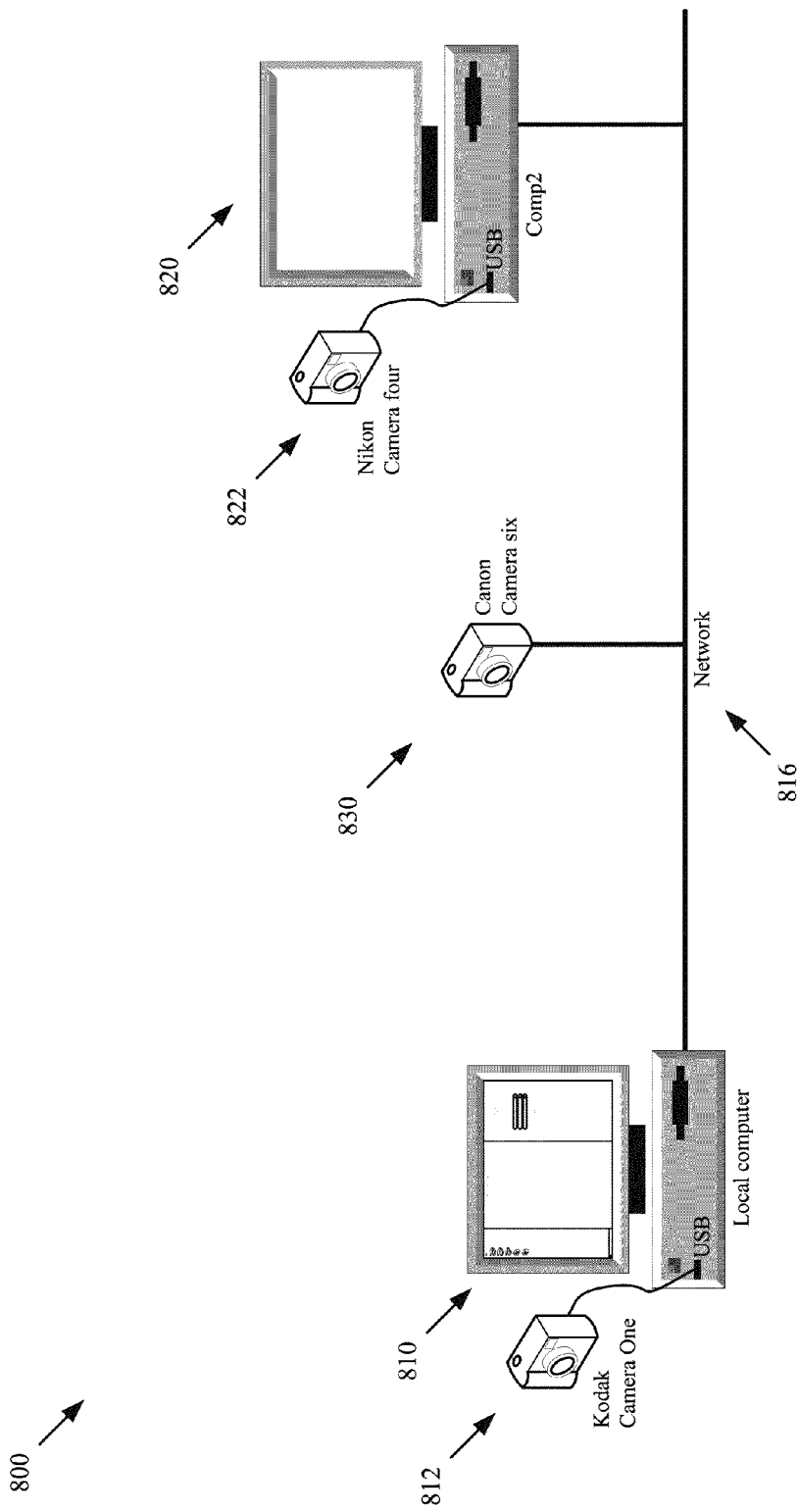
FIG. 8 illustrates a system of some embodiments that includes two computers and three cameras.

As described above, an image capture application operating on a first computer may download image files and metadata from cameras that are (i) directly connected to the first computer or (ii) connected to a network to which the first computer is connected, including through a second computer. FIG. 8 illustrates a system 800 of some embodiments that includes two computers 810 and 820 and three cameras 812, 830, and 822. Each of the three cameras is made by a different manufacturer (Kodak®, Nikon®, and Canon®, though cameras made by any other manufacturers are possible as well). Both of the computers and camera 830 are connected directly to a network 816 (e.g., a local area network, wide area network, network of networks such as the Internet, etc.) through which devices and folders may be shared. Camera 812 is connected directly to computer 810 while camera 822 is connected directly to computer 820. These connections, though shown in FIG. 8 as USB connections, may be any other sort of direct connection (e.g., FireWire®, Bluetooth®, etc.)

The image capture application of some embodiments operates on the first computer 810 and is able to recognize, download metadata from, and synchronize the times of all three of the cameras 812, 822, and 830. Thus, the image capture application can read from devices that are (i) connected directly to the computer on which the application operates (e.g., camera 812) or (ii) connected to the network to which the application's computer is connected (e.g., camera 822 or 830). Devices in the later group may be either connected directly to the network (e.g., camera 830) or connected to a second computer that is connected to the network (e.g., camera 822).

II. Download Indicator

The image capture application of some embodiments allows a user to import image files from a camera (sometimes referred to as downloading the files from the camera). Some embodiments provide a GUI with controls for selecting particular images to import. In some cases, a user may wish to import different images to different folders. For instance, the user may have separate folders for different groups of people photographed with the same camera (e.g., one folder for family and a second folder for friends) or separate folders for high quality pictures as opposed to mediocre pictures. The user may also simply desire to not import all of the pictures off of the camera in order to save hard drive space.

If the application is set to automatically delete the images from the camera after importing them, then it is easy to keep track of which images have been imported because any image left on the camera has not been imported. However, when the user wants to keep the images on the camera rather than deleting them after importing them, it can be difficult to keep track of which images have already been imported and which images have not yet been imported.

Figure 9:
FIG. 9 illustrates a GUI with a visual indicator for each image file that indicates whether the image file has been imported to the computer by the image capture application.

Accordingly, some embodiments provide a visible indicator that a particular image file has previously been imported from a camera. FIG. 9 illustrates a GUI 900 with a visual indicator for each image file that indicates whether the image file has been imported to the computer by the image capture application. This allows a user to more easily distribute a set of pictures to multiple folders on a computer without accidentally making multiple copies on the computer or accidentally omitting a copy from the computer. The GUI 900 includes thumbnail display area 910, control area 920, and device display area 930. Thumbnail display area 910 displays low resolution representations (thumbnails) of the images on the camera. The control area 920 displays controls that allow a user to activate an import image tool and to set the folder to which the image files from the camera will be imported. The device display area 930 displays a menu of devices for selection by a user. As can be seen, the currently selected device is an SD Card. In some embodiments, an SD Card attached to a camera will be treated as a separate device from the camera by the image capture application.

Thumbnail display area 910 includes thumbnails 911, 912, and 913 (among several others), with import indicators 914 on thumbnails 911 and 912 (among others) and no import indicator on thumbnail 913. The thumbnail display area 910 allows a user to select particular images (e.g., by clicking on particular thumbnails, dragging a box around a set of thumbnails, touching particular thumbnails on a touchscreen, etc.). A set of selected thumbnails can be imported to a computer via a selection of the import control 922 in import control area 920. In some embodiments, a user can use folder selector 924 to select a destination folder for the imported images, either before or after thumbnails are selected. When import control 922 is selected, the image files corresponding to the selected thumbnails are copied to the folder indicated by folder selector 924. In some embodiments, the GUI includes an "import all" control 926. This control imports all images from the selected device to the specified folder, regardless of whether the thumbnails have been selected.

After importing image files from the camera, the image capture application places a checkmark next to the thumbnails of the imported images. As the image files are often imported one file at a time, some embodiments place the checkmark next to each thumbnail as soon as the corresponding image file has been imported while other embodiments place all checkmarks after all chosen images have been imported. As shown in the figure, the image file represented by thumbnail 913 has not been imported (as it lacks an import indicator).

Figure 10:
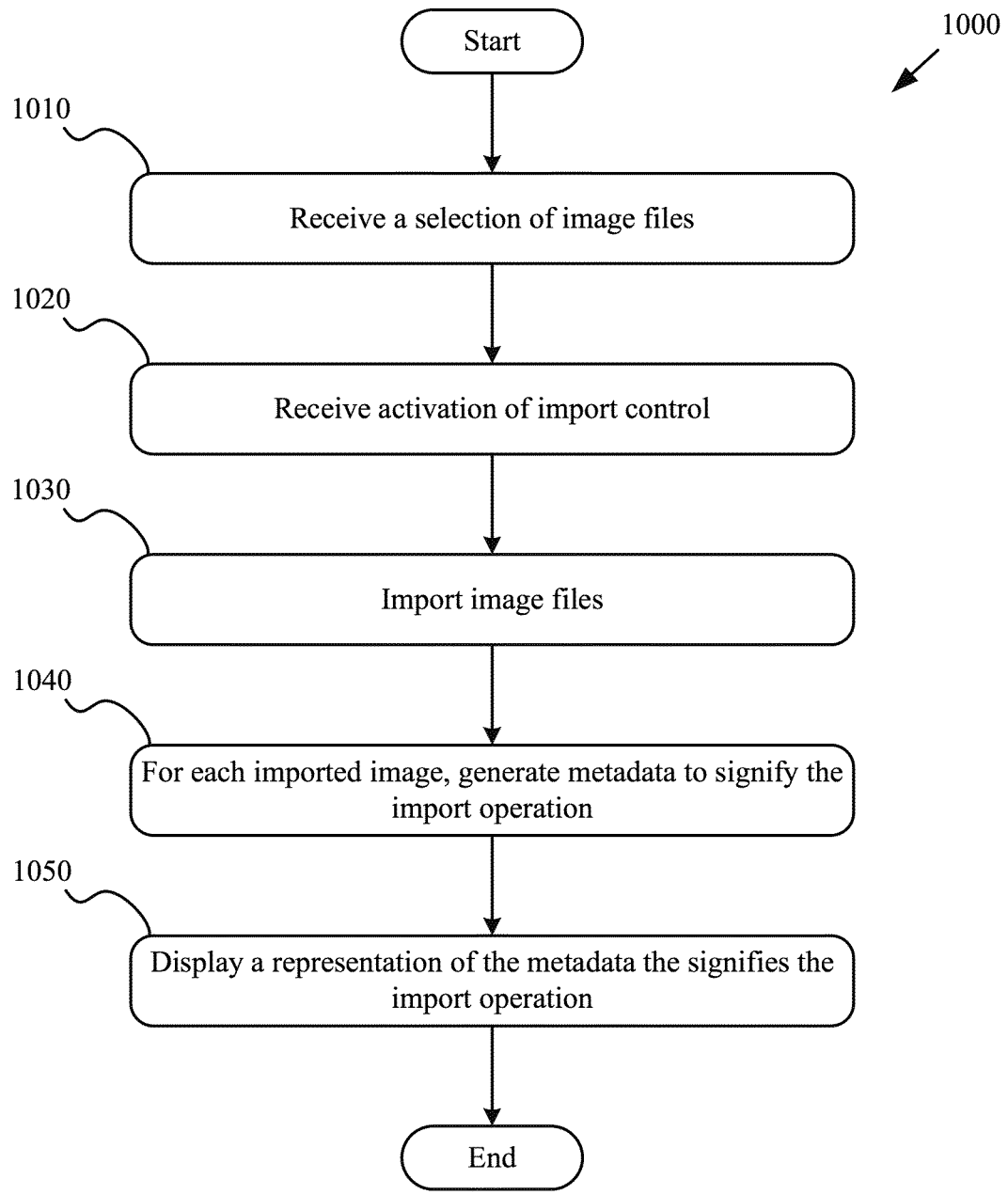
FIG. 10 conceptually illustrates a process of some embodiments for importing files and visually marking them as such.
Figure 11:
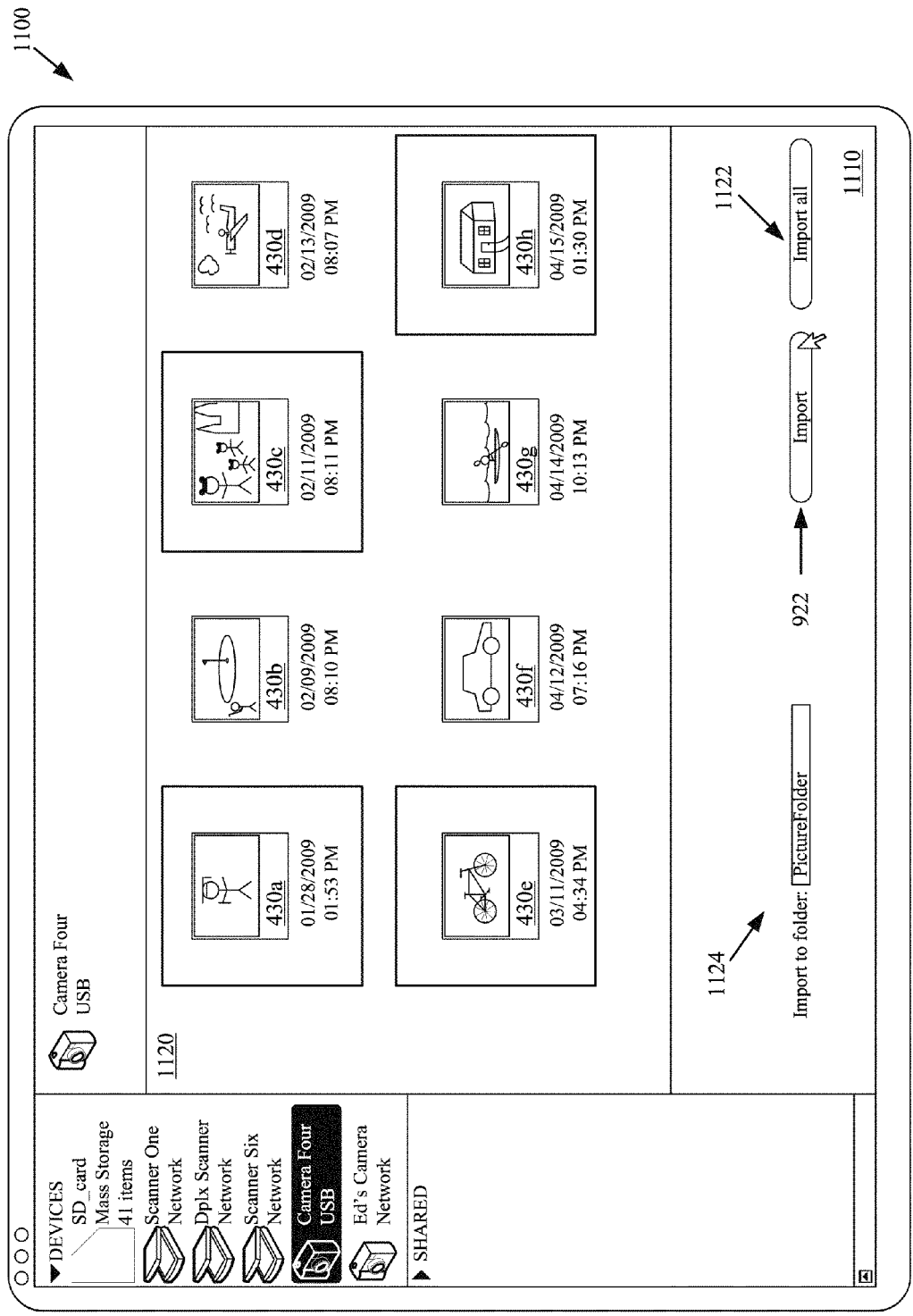
FIGS. 11 and 12 illustrate a GUI with several images selected for import.

FIG. 10 conceptually illustrates a process 1000 of some embodiments for importing files and visually marking them as such. The process 1000 will be described by reference to FIGS. 11-12. FIG. 11 illustrates a GUI 1100 with several images selected for import. The GUI 1100 includes thumbnail display area 1110 and camera control area 1120. Thumbnail display area 1110 shows low resolution representations (thumbnails) of the images on the camera. The camera control area 1120 contains import control 1122 and import all control 1126 which enable a user to activate an import image tool. The image control area 1110 also contains folder selector 1124 for allowing a user to set the folder to which the image files from the camera will be imported.

The process 1000 begins when the GUI receives (at 1010) a selection of one or more image files. For example, in FIG. 11 the image files represented by thumbnails 430a, 430c, 430e, and 430h have been selected as indicated by the rectangles surrounding those thumbnails of the images. In some embodiments, file names are used instead of (or in addition to) thumbnails. Also, different embodiments may use different ways to indicate that an image has been selected (e.g., highlighting the metadata, displaying a contour around only the thumbnail image, etc.).

Figure 12:
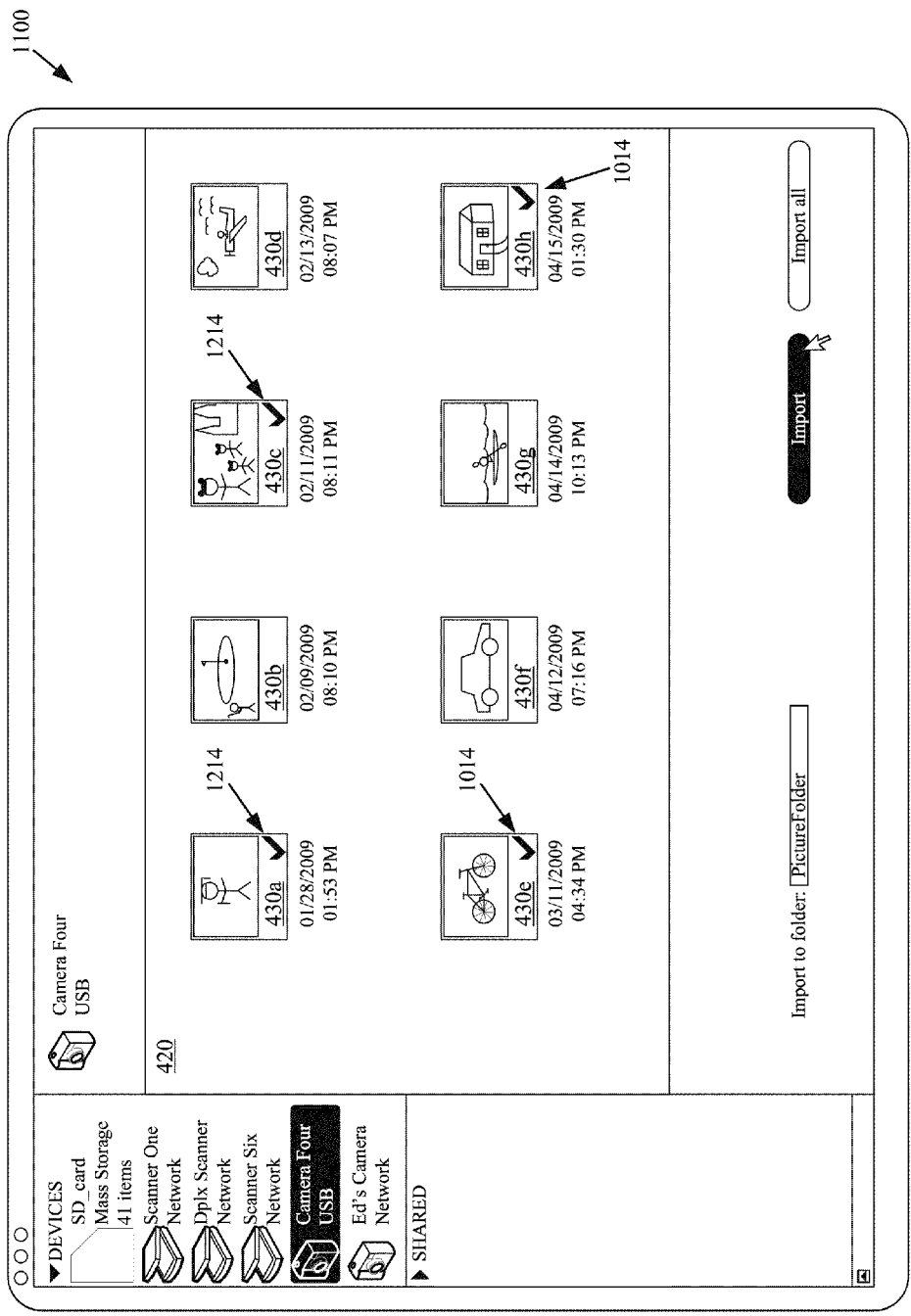

The process next receives (at 1020) an activation of an import control. In FIG. 12 the activation of the import control 1122 is indicated by the inversion of the colors of import control 1122. This activation may be by way of a user clicking the import button with a cursor (as shown in FIGS. 11-12), tapping the import button on a touchscreen, etc. In response to the activation of the import control, the process imports (at 1030) the image files corresponding to the selected thumbnails. In the example of FIG. 11, the image files are imported to a folder called "PictureFolder", as indicated by folder selection tool 1124. The process then generates (at 1040) metadata to signify that the selected image files have been imported. The process then displays (at 1050) a visual representation of the metadata that indicates that the imported image files have been imported. As shown in FIG. 12, some embodiments visually represent this metadata as checkmarks 1214.

Some embodiments display checkmarks on a folder-by-folder basis. That is, when a folder is selected, the image capture application compares the metadata of the images in the folder (e.g., size, creation date, file name) to the metadata of the images on the camera. The image capture application of some such embodiments displays a checkmark to indicate that a copy of a file is already stored in the folder. When a different folder is selected, the image capture applications of some embodiments evaluate the new folder to determine whether images in the folder are duplicates of the images stored in the camera. In some such embodiments, the metadata indicating which images are duplicates is repeatedly updated so that when an image is removed from the designated folder (e.g., deleted or moved) the checkmark is removed from the displayed metadata of that image. Note that in some such embodiments, the metadata about the import status of an image is stored separately from the file and does not get automatically copied when the file is copied.

In the process of marking the image files as imported, the image capture application of some embodiments stores metadata about the individual image files. This stored metadata relates to the status of a file as "imported". The data may be stored on the computer, on the camera, or on both the computer and the camera. When the data is stored on the computer, it can be stored for different durations. For example, it could be stored until the connection between the camera and the computer is broken or it can be stored for longer periods. In some embodiments, the metadata stored on the computer includes an identification of the folder to which the image has been imported.

In embodiments that store metadata (of import status) on the camera, the metadata can be stored separately from the files, or it can be stored as metadata associated with each file. The metadata stored on the camera in some embodiments is a general indication that the image file has been downloaded. In such embodiments, when the camera is controlled by an instance of the image capture application on another computer, the image capture application indicates that the images have been imported. In other embodiments, the import metadata indicates to which specific computer the images have been imported. In some such embodiments, the metadata about whether the pictures have been imported does not travel with the camera when the camera is moved to different computer.

In some embodiments, the GUI displays the identity of the folder and/or computer to which an image file has been imported. In some such embodiments, the display of the identity of the folder is provided when a user performs a GUI operation such as hovering a cursor over, or clicking on, a thumbnail or import indicator. Some embodiments store data indicating multiple folders to which an image has been imported when an image has been imported to multiple folders. Some embodiments provide one type of marks when an image has been imported to one folder, and a different mark when the image has been imported to more than one folder.

III. Plotting Metadata without Importing Images

Some digital cameras include a built in global positioning system (GPS) receiver or in some other way receive and store information about the location at which a picture is taken. Such cameras store the location of the camera at the time and date that the image was taken and/or other location information (e.g., which direction the camera was pointing). This metadata may be retrieved by the image capture application of some embodiments. Accordingly, the image capture application of some embodiments includes a map plotting feature for images taken by such cameras. Some such applications save time and hard drive space by retrieving metadata of image files stored on the camera without retrieving the image files themselves. For example, some embodiments can open a map on a computer corresponding to a location indicated in the metadata of a particular image without importing the image. In some embodiments, the image capture application can open such a map without even retrieving a thumbnail of the image from the camera.

Similarly, some embodiments display a map showing the locations indicated by metadata of particular images on a camera or other image storage device without importing the particular images to the computer. Some embodiments also retrieve thumbnails of the image files from the camera and display the thumbnails on the map without importing the full image file. One of ordinary skill in the art will understand that many digital cameras store images on removable media such as SD cards. Accordingly, some embodiments provide the same image transfer features (marking, map plotting) when retrieving metadata and images directly from an SD card rather than through a camera. The figures in this section show the application as working with metadata from images on an SD card, though one of ordinary skill in the art will realize that the described features can be applied to working with metadata from images on digital cameras or other storage devices in some embodiments.

Figure 13:
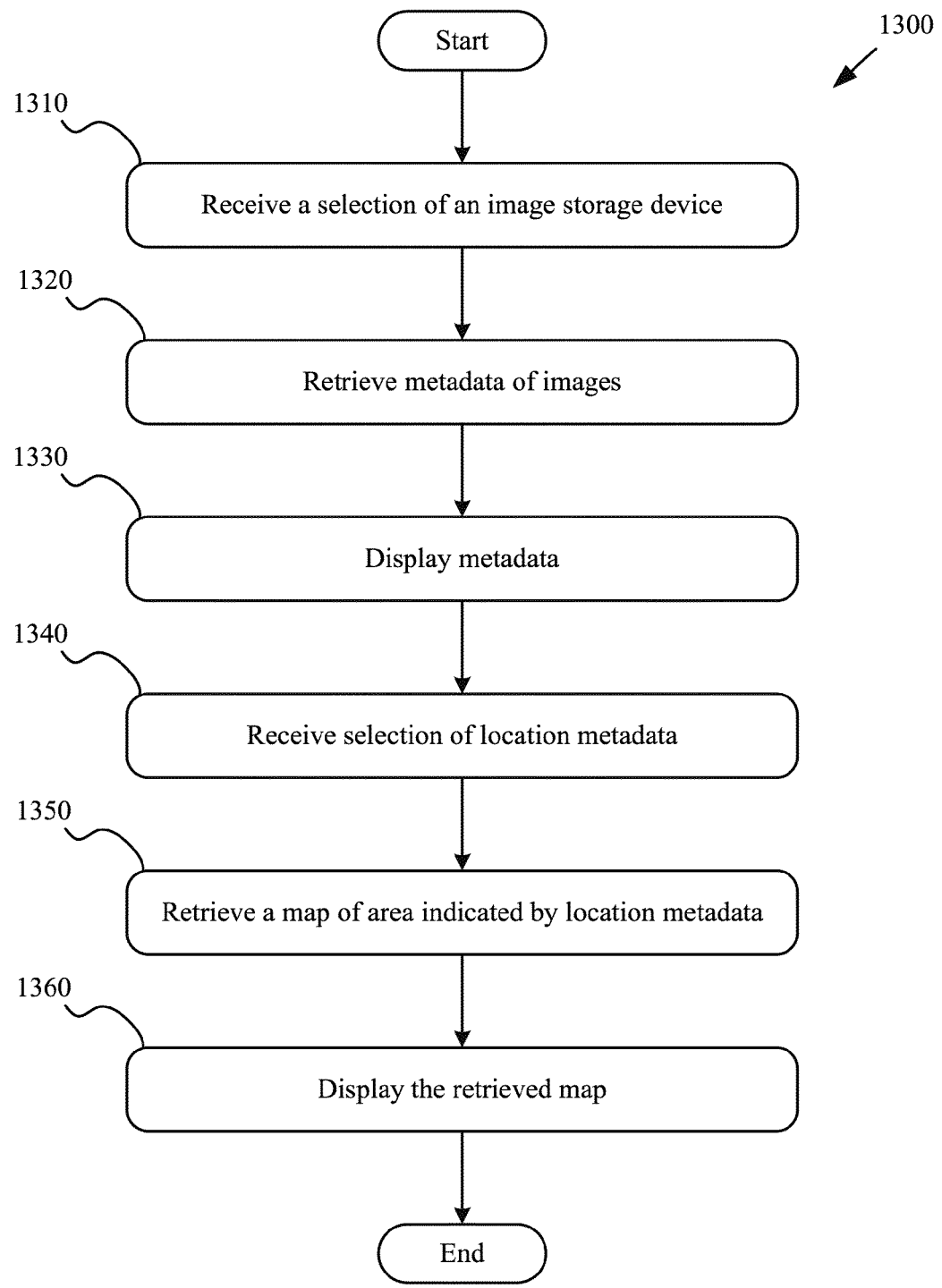
FIG. 13 conceptually illustrates a process for displaying a map based on geographic locations associated with image files.
Figure 14:
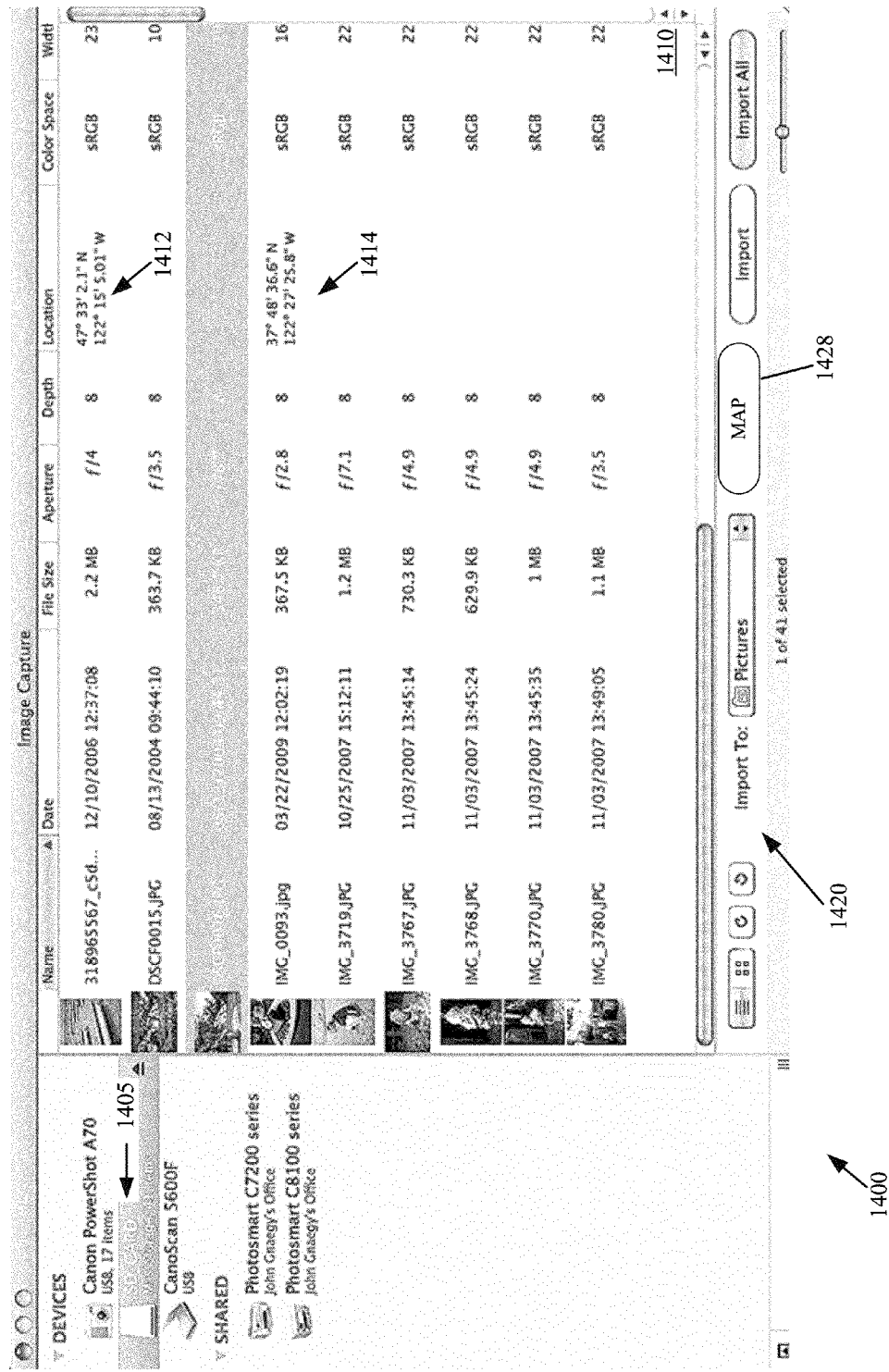
FIG. 14 illustrates a GUI that displays a list of image files with geographic location coordinates.

FIG. 13 conceptually illustrates a process 1300 for displaying a map based on geographic locations associated with image files. The process 1300 will be described in relation to FIG. 14. FIG. 14 illustrates a GUI 1400 that displays a list of image files with geographic location coordinates. Location coordinates are only displayed for those images that have such metadata. The GUI 1400 includes image listing area 1410 and control area 1420. The image display area 1410 displays a list of characteristics associated with image files on an SD card (e.g., an SD card from a camera). In some embodiments, these characteristics include geographic metadata associated with image files stored on the SD card. Some embodiments display this data as coordinates 1412 and 1414 of longitude and latitude for a given image. Some digital cameras do not store location information. Accordingly, some of the rows of metadata for images on the SD card leave blank the area for location metadata, indicating that this data is not known. The control area 1420 includes a map activation button 1428. In some embodiments, the selection of map activation button causes the display of a map using location coordinates of one or more images.

The process 1300 receives (at 1310) a selection of an image storage device (e.g., a camera or an image storage medium). For example, in FIG. 14, the GUI has received a selection of SD card 1405. The process then retrieves (at 1320) metadata of the image files stored on the selected device. This metadata may include a geographic location associated with the image file, thumbnails of the images, timestamps for the images, etc. In some embodiments, no data containing an image (including thumbnails) is downloaded by the process before plotting representations of the image files on the map. For example, some such embodiments download the geographic location data of the image file and the filename of the file, but not a thumbnail. The process then displays (at 1330) the metadata. FIG. 14 displays metadata associated with image files stored on the selected camera in image listing area 1410.

The process then receives (at 1340) a selection of a geographical location. For example, in FIG. 14, a user could select coordinates 1412 or 1414 by double clicking on the coordinates, by tapping the coordinates on a touchscreen, etc. The process then retrieves (at 1350) map data for an area about the location indicated by the selected coordinates. In some embodiments, the image capture application retrieves the map data by opening a web browser to an online map website. The image capture application provides the coordinates to the website and the website then displays the relevant map.

Figure 15:
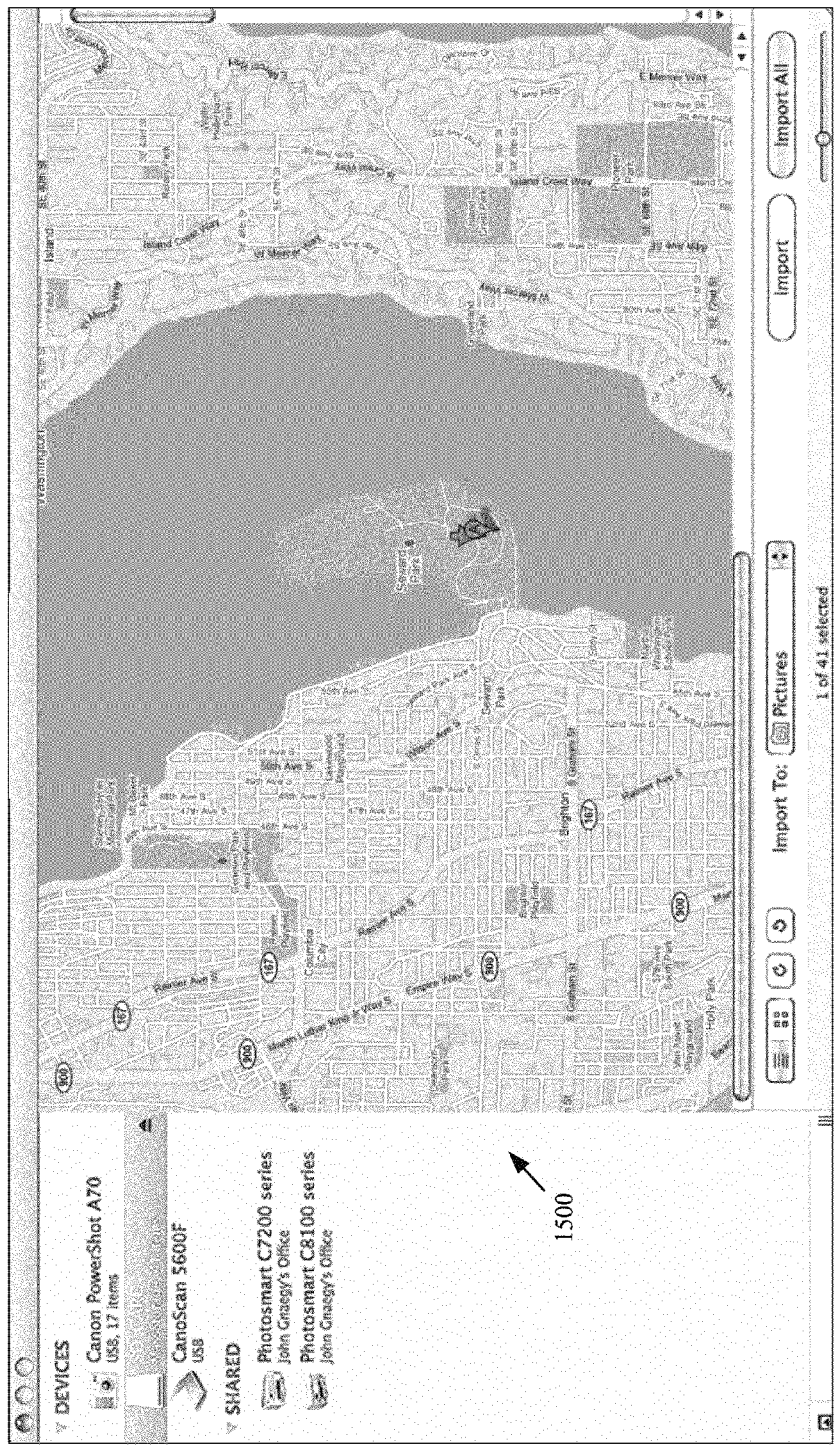
FIG. 15 illustrates a map around a location in the metadata of an image file.

The retrieval of the map data in other embodiments is from an internal database of the application or from some external source (e.g., an Internet map site). The process then displays (at 1360) a map of an area that includes the location associated with the selected image file. FIG. 15 illustrates a map around a location in the metadata of an image file. Specifically, FIG. 15 shows a map 1500 showing the area around the coordinates 1414.

In some embodiments, the map 1500 represents an area surrounding the selected coordinates from the metadata. In other embodiments, the map 1500 represents an area with the coordinates from the metadata on an edge or corner of the map. The process 1300 then ends. In some embodiments, the command to view a map can come from a map activation control, however some embodiments do not have a specific map activation control and activate the map in other ways, such as when a user selects the coordinates. In some embodiments, the displayed map includes a display of one or more thumbnails or other representations (e.g., file names) at the associated coordinates. In some embodiments, the activation of the map view can occur before the selection of an image storage device. In other embodiments, the map display may be the default view for representations of images with associated geographic coordinates.

Figure 16:
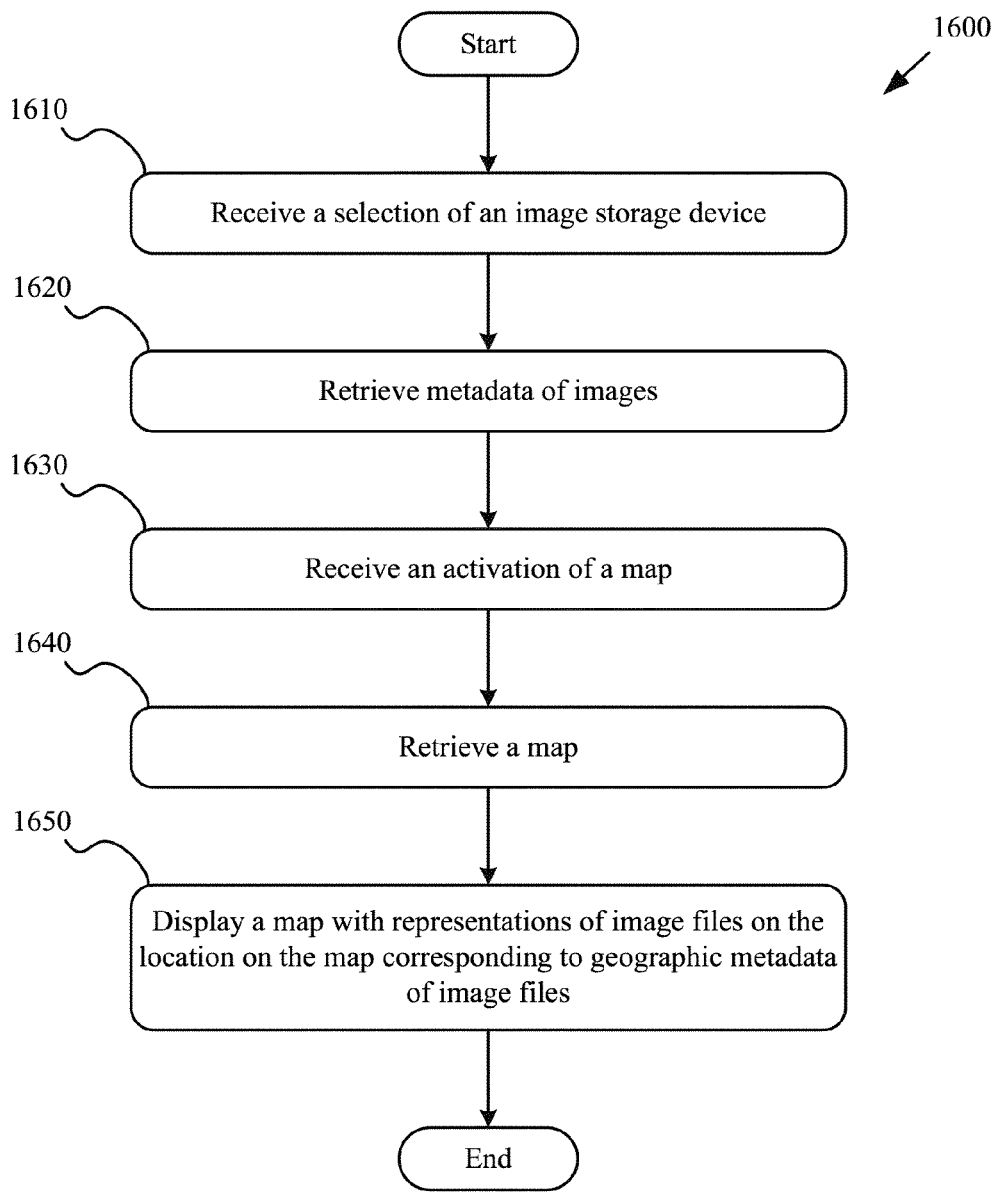
FIG. 16 conceptually illustrates a process of some embodiments for displaying images on a map.
Figure 17:
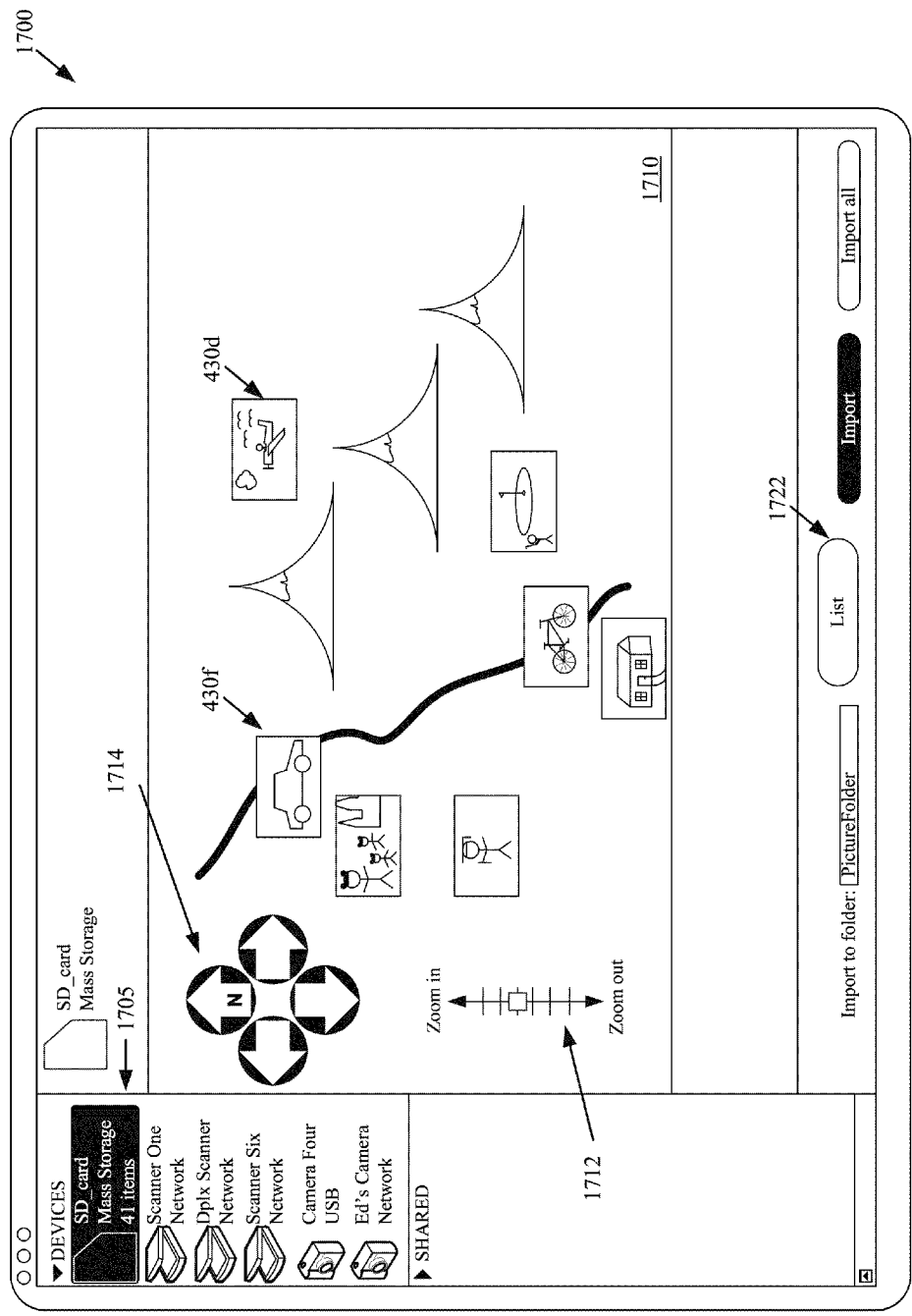
FIG. 17 illustrates a GUI that displays thumbnails of image files plotted on a map.

FIG. 16 conceptually illustrates a process 1600 of some embodiments for displaying images on a map. The process 1600 will be described in relation to FIG. 17. FIG. 17 illustrates a GUI 1700 that displays thumbnails of image files plotted on a map. The metadata that indicates the geographical locations for the image files is retrieved from an SD card without retrieving the images. The figure illustrates a selected SD card icon 1705, a map 1710, and a list control 1722. The selected SD card represented by icon 1705 stores image files. The GUI shows thumbnails of the images at the locations on the map 1710 associated with the individual pictures on an SD card. In some embodiments the geographic location data was associated with the file as metadata when the image was first taken by a camera by using a GPS or similar device that is part of the camera or attached to the camera. When selected, the list control 1722 causes the image capture application GUI to switch to the list view as illustrated in FIG. 14. Map 1710 includes controls for zooming in and out 1712 and for scrolling to different locations 1714.

The process 1600 receives (at 1610) a selection of an image storage device (e.g., a camera or an image storage medium). FIG. 17 illustrates that the icon 1705 for an SD card has been selected. The process retrieves (at 1620) metadata of the images. This metadata may include a geographic location associated with the image file or thumbnails of the images (such as 430d and 430f as shown in FIG. 17), or other metadata associated with the images. In some embodiments, no actual image data is downloaded by the process before plotting representations of the image files on the map. For example, some such embodiments download the geographic location data of the image file and the filename of the file.

The process then receives (at 1630) a command to activate a map view. In some embodiments, the command can come from a map activation control. In other embodiments, the GUI 1700 may be the default view for representations of images with associated geographic coordinates. In some embodiments, the activation of the map view can occur before the selection of an image storage device.

The process then retrieves (at 1640) a map. The retrieval of the map may be from an internal database of the application or from some external source (e.g., an Internet map site). The process then displays (at 1650) the map with representations of image files on the location on the map corresponding to the geographic metadata of the image files. FIG. 17 illustrates this with map 1710. On map 1710, the GUI 1700 displays thumbnail images 430d and 430f at map coordinates corresponding to the geographic location metadata of the images.

Some embodiments allow a user to select the representations on the map for import. For example, some embodiments allow a user to click on a thumbnail (or other representation) of an image plotted on a map to select that image file. Some embodiments allow a user to drag a box around multiple images (e.g., all images taken in a particular geographic area) to select them. Some embodiments allow a user to input a range of coordinates to select all images within that range (e.g., by panning and zooming the map or by typing in sets of coordinates that form a boundary of a region). As mentioned above, some embodiments include a list control button 1722 to switch the image viewer between the map 1710 and a view with a list of image files.

IV. Software Architecture

In some embodiments, the processes described above are implemented as software running on a particular machine, such as a computer or a handheld device, or stored in a computer readable medium. Sub-section IV.A. below describes the high-level architecture of a computer system (or several computer systems) that performs image capture and modification tasks such as those described above. Sub-section IV.B then describes in more detail the modules and application programming interfaces (APIs) used to carry out the image capture and modification tasks.

A. Application Architecture

In some embodiments, the image capture application is a stand-alone application or is integrated into another application, while in other embodiments the application might be implemented within an operating system. Furthermore, in some embodiments, the application is provided as part of a server-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

In some embodiments, the image capture application operates using multiple separate modules on a single computing device (e.g., personal computer, smartphone, etc.). In some embodiments, three separate types of modules are used: (i) a device module (e.g., a device driver) that launches when an image capture device associated with that module is connected to the computer and provides an interface between the image capture device and the other modules on the computer, (ii) a high level image capture client (e.g., an application such as iPhoto®, Aperture®, etc.), and (iii) an Image Capture Extension that runs in the background and provides connections between the device modules and the high level applications. In some embodiments, the Image Capture Extension is part of an operating system of the computer or is developed to directly interface with the operating system.

Figure 18:
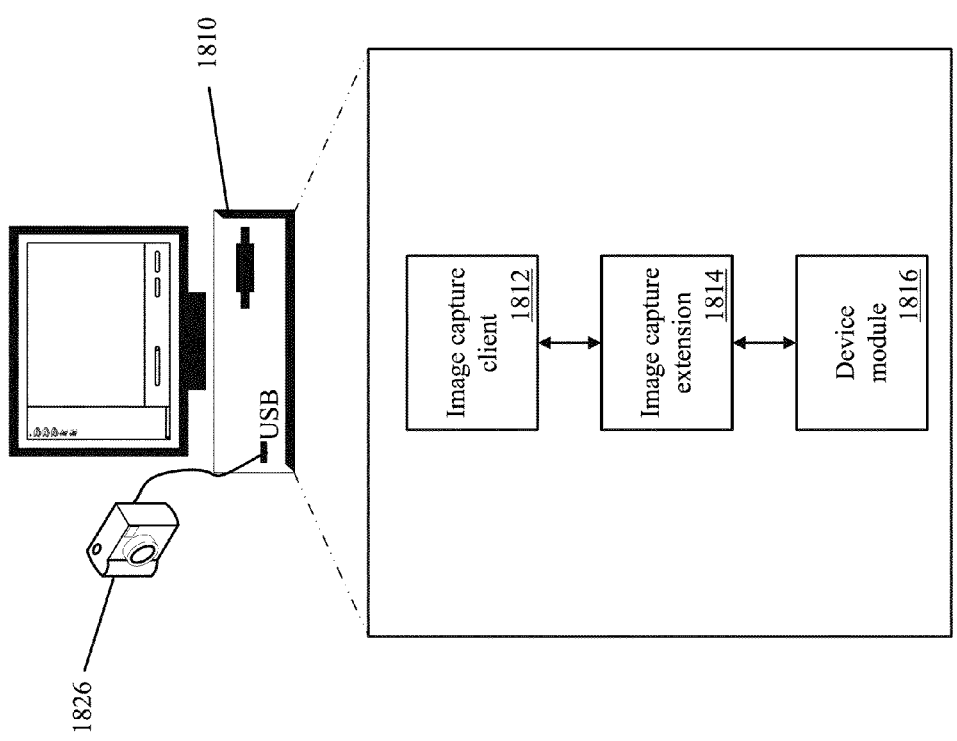
FIG. 18 illustrates the high-level software architecture of a computer that implements some embodiments of the invention.

FIG. 18 illustrates the high-level software architecture of a computer 1810 that implements some embodiments of the invention. A camera 1826 is connected to computer 1810. As illustrated, image capture client 1812, Image Capture Extension 1814, and device module 1816 are all operating on computer 1810.

The device module 1816 provides an interface between the external device 1826 (connected to the computer 1810 via a port such as a USB interface, FireWire® interface, Bluetooth® interface, etc.) and the Image Capture Extension 1814. The device module 1816 is a device driver for external device 1826 in some embodiments, and is able to translate commands between the Image Capture Extension 1814 and the external device 1826. Accordingly, the device module 1816 launches automatically when camera 1826 is connected to computer 1810 in some embodiments.

Image Capture Extension 1814 of some embodiments provides connections between device modules (in this figure, device module 1816) and image capture clients (in this figure, image capture client 1812). In some embodiments, the Image Capture Extension 1814 runs in the background of computer 1810 (without an interface visible to the end-user of the image capture clients). The Image Capture Extension 1814 provides an interface between the device module 1816 and the image capture client 1812. That is, in the image capture architecture illustrated, Image Capture Extension 1814 acts as an intermediary between device modules and image capture clients. This relieves the developers of image capture client 1812 from having to develop their applications to work with individual devices such as camera 1826. As described in further detail below, the Image Capture Extension 1814 translates commands between the image capture client 1812 and the device module 1816.

Figure 20:
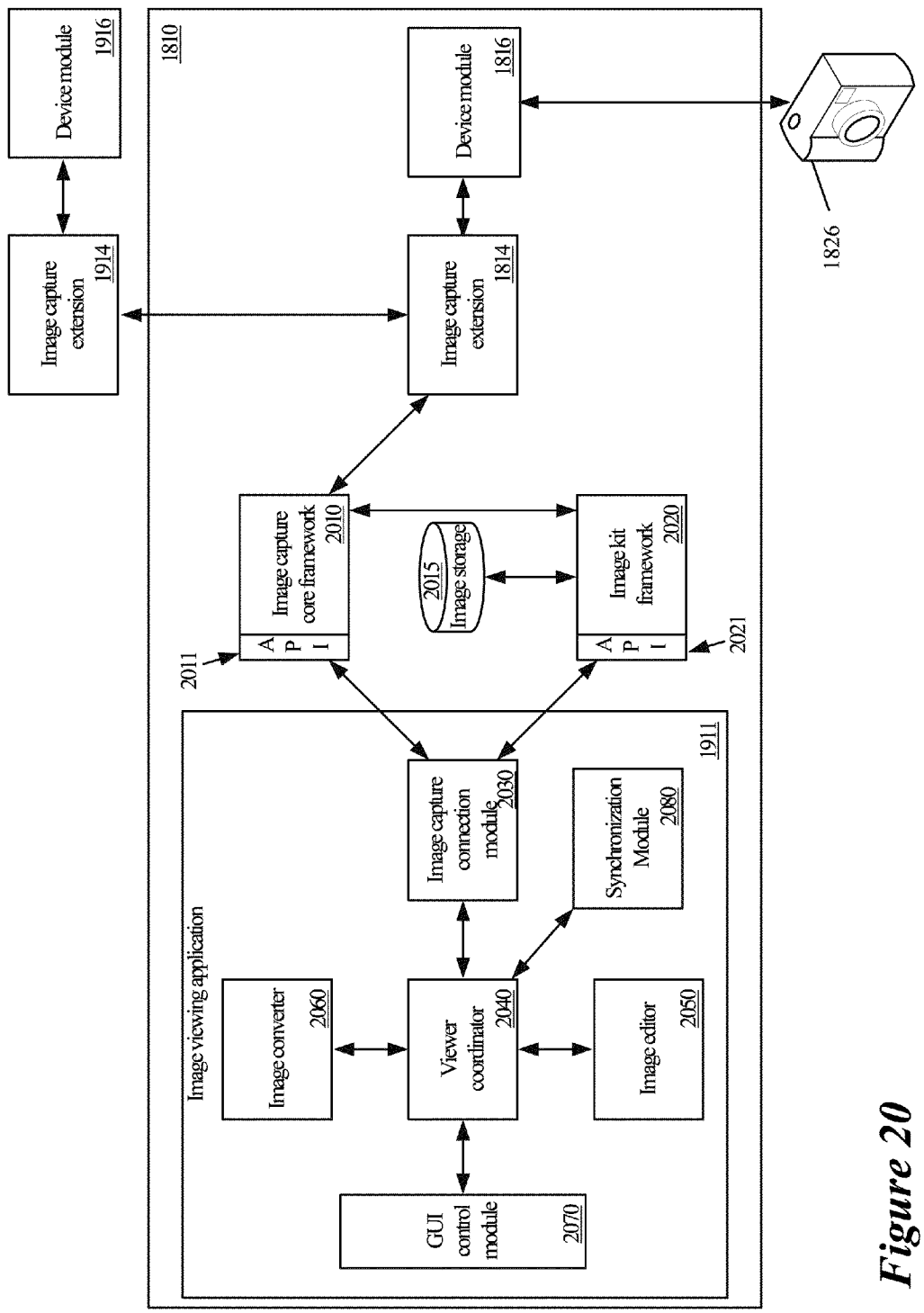
FIG. 20 conceptually illustrates a more detailed software architecture of the computer illustrated in FIG. 18.

The image capture client 1812 of some embodiments controls user interface and other high level image-viewing and image-editing functions. In some embodiments, the image capture client 1812 is an application provided by the same entity (e.g., the operating system provider, a camera manufacturer, etc.) that provides the Image Capture Extension 1814. Alternatively, the image capture client could be a third party application that uses application programming interfaces (APIs) provided by the same entity that produces the Image Capture Extension 1814 in order to interface with the Image Capture Extension 1814. The third party application that uses these APIs might be a word processor, an image viewer, an image editor, a spread sheet, a web browser, or any other type of application. The APIs enable applications produced by third parties to work with the attached devices through the Image Capture Extension 1814. The use of APIs of some embodiments by such third party applications is illustrated in FIG. 20, described below.

In different embodiments, the device module 1816 is developed by either the producer of the image capture device 1826 with which it interfaces or by a third party programmer. In some embodiments, the developers of the Image Capture Extension 1814 provide APIs to the manufacturers of image capture devices (e.g., device 1826). These manufacturers then use the APIs to develop the device modules. The APIs enable the device modules to interface with the Image Capture Extension 1814.

As noted above, the image capture client, Image Capture Extension, and device module are all executed as separate processes in some embodiments. Because these modules are executed as separate processes, new device modules can be dynamically added to the architecture (e.g., when new image storage devices are connected). The separation of the processes also allows multiple image capture clients to use the same image storage extension. Through this tiered architecture, image capture clients and similar applications may access device modules (and thus external devices) on remote computers, as is illustrated in FIG. 19.

Figure 19:
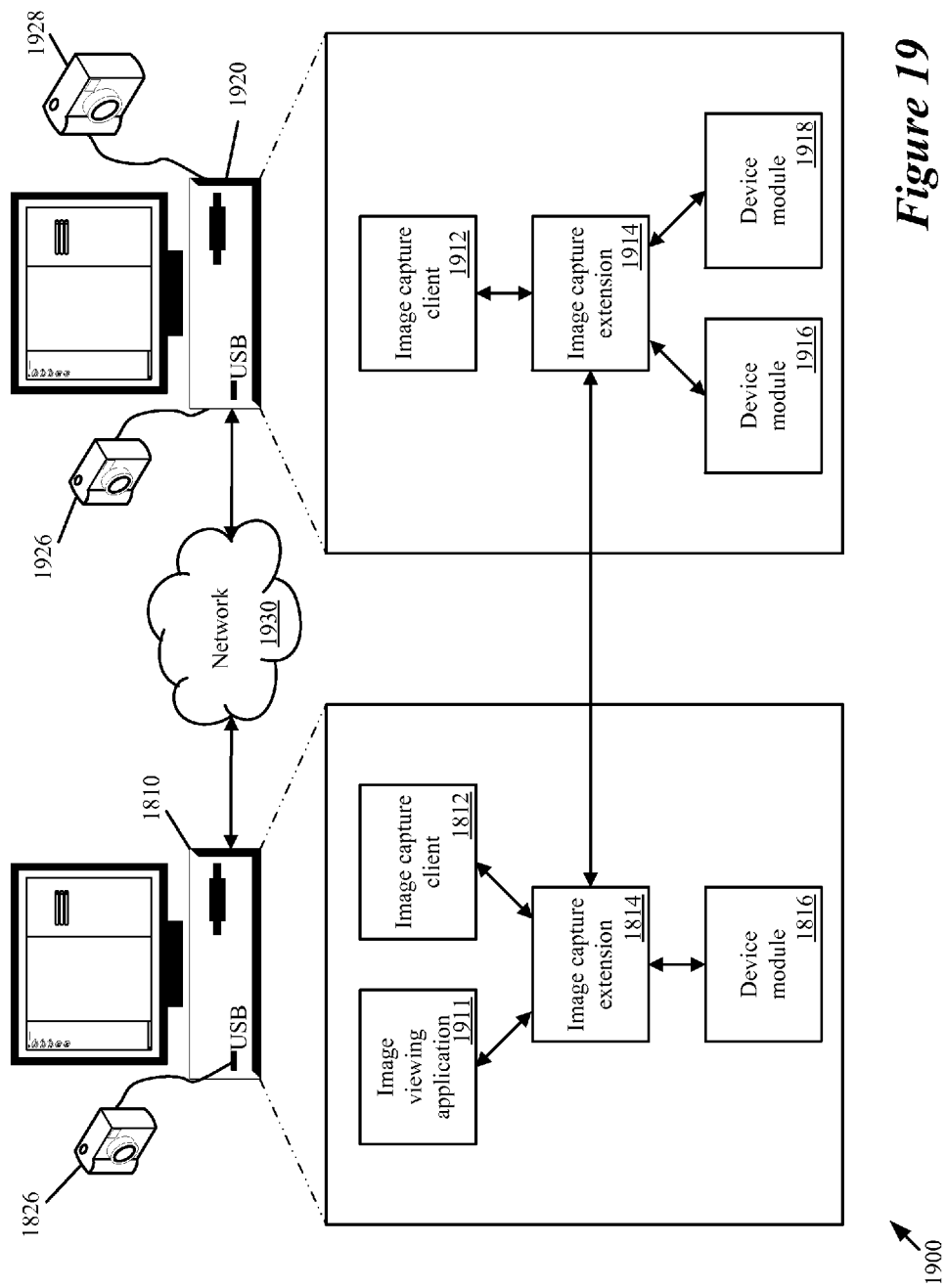
FIG. 19 conceptually illustrates an image capture architecture distributed over multiple computers.

FIG. 19 conceptually illustrates an image capture architecture 1900 distributed over multiple computers. The image capture architecture allows multiple applications on one computer to access multiple devices, including devices directly connected to another computer. As shown, the image capture architecture 1900 includes computer 1810, to which device 1826 is connected, as well as computer 1920, to which devices 1926 and 1928 are connected.

The computers 1810 and 1920 are connected through a network 1930. The network 1930 may be a local area network, wide area network, telephony network, wireless network, network of networks such as the Internet, etc. As shown in FIG. 19, computer 1810 is executing an image viewing application 1911 in addition to the modules shown in FIG. 18. Like the image capture client 1812, the image viewing application 1911 controls user interface and other high level image-viewing and image-editing functions. In different embodiments, the image viewing application 1999 might be an application provided by the same entity as the Image Capture Extension 1814 or a third party application that uses the previously-mentioned APIs to interface with the Image Capture Extension 1814. Like the image capture client 1812, the image viewing application 1911 accesses the device 1826 through the Image Capture Extension 1814.

The modules executing on the computer 1920 include an image capture client 1912, an Image Capture Extension 1914, and device modules 1916 and 1918. These device modules 1916 and 1918 are device modules that enable the Image Capture Extension 1914 to interface with cameras 1926 and 1928. The Image Capture Extension 1914 is the same as Image Capture Extension 1814 in some embodiments. In other embodiments, the image capture extensions are different (e.g., if the two computers are running different operating systems). Similarly, the image capture client 1912 may be the same as the image capture client 1812, but may also be a different application. The two image capture clients might be different versions of the same application, designed for operation on the two different operating systems.

The illustrated architecture enables multiple applications to simultaneously access a single device (e.g., image viewing application 1911 and image capture client 1812 both accessing device 1826) in some embodiments. However, some embodiments only permit one application to actually use the device (e.g., send comments to the device and receive information from the device) at a time, though both can access the Image Capture Extension simultaneously. Furthermore, the architecture also enables one application to access multiple devices simultaneously (e.g., image capture client 1912 accessing devices 1926 and 1928).

The architecture also allows an application on a first computer (e.g., image viewing application 1911 on computer 1810) to access devices connected to a second, different device. As illustrated in FIG. 19, the Image Capture Extension 1814 interfaces (through network 1930) with the Image Capture Extension 1914. Through this interface, the applications 1911 and 1812 on computer 1810 can directly access the devices 1926 and 1928 on the second computer. Similarly, the image capture client 1912 operating on the second computer 1920 can directly access the device 1826 that is physically connected to the first computer. In some embodiments, these connections can occur simultaneously—that is, the image viewing application 1911 could access the device 1928 while the image capture client 1912 accesses the device 1826.

B. Application Programming Interfaces

As mentioned above, in some embodiments an image capture client uses calls to APIs in order to interface with an Image Capture Extension. In some embodiments, the APIs enable the image capture client to access one or more frameworks that perform image capture operations (e.g., image selection, image importing, metadata related operations, etc.). In such embodiments, the frameworks are accessible to clients from a variety of parties (i.e., developers) and that perform a variety of different functions. For example, the image capture client of such embodiments could be developed by the same programmers as the frameworks or by a third party with access to the framework APIs. The client application could be an image capture application, an image viewing application, an image editing application, an e-mail application, a word processing application, or any other type of application whose programmers choose to access the functionality provided through the frameworks.

In some embodiments, frameworks are libraries of one or more files that contain modularized functions that are accessible through calls to one or more APIs that determine the expected inputs and outputs of the modularized functions. The frameworks and their APIs allow an application to provide a GUI and other high-level functionality that takes advantage of an image capture engine supplied separately.

The APIs enable a form of black-box programming. The third party application acts as a front end and provides a user interface and a certain level of functionality to a user. When the user specifies (e.g., through the user interface) a desired interaction with an image storage device, the third party application sends commands through the APIs to an image capture engine to cause the image capture engine to perform operations that control the cameras. The APIs enable applications produced by third parties as well as additional applications from the entity that produced the APIs to work with the attached devices without a need to worry about the internal mechanics of the image capture engine.

FIG. 20 conceptually illustrates a more detailed software architecture of the computer 1810, showing how the image viewing application 1911 accesses a camera through framework APIs. As shown in FIG. 20, the computer 1810 includes the image viewing application 1911, an Image Capture Core framework 2010 with APIs 2011, an Image Kit framework 2020 with APIs 2021, the Image Capture Extension 1814, and the device module 1816. In some embodiments, the Image Capture Extension 1814 and the two frameworks 2010 and 2020 collectively form an image capture engine.

In some embodiments, the image viewing application 1911 provides a GUI such as those illustrated in the previous sections. That is, the image viewing application 1911 provides the user with the functionalities to select devices, synchronize times, etc. As shown, the image viewing application includes an image capture connection module 2030, a viewer coordinator 2040, an image editor 2050, an image converter 2060, a GUI control module 2070, and a synchronization module 2080. One of ordinary skill will recognize that these modules are not exhaustive of all the modules that might be part of such an application.

The image capture connection module 2030 sends data to and receives data from the Image Capture Core framework 2010 and Image Kit framework 2020. That is, the image capture connection module 2030 provides the communication with the image capture engine of some embodiments for the image viewing application 1911. The viewer coordinator 2040 manages the processes of the image viewing application 1911 in some embodiments, and provides communication between the different modules. The image editor 2050 receives directives from a user to modify images—e.g., to resize, crop, filter, etc. the images and performs these actions to modify the actual image files. In some embodiments, the image editor 2050 is itself made up of numerous different modules, each for performing a specific image editing function. The image converter 2060 handles the conversion of image files from one format to another. The GUI control module 2070 handles the provision of the GUI, including modifications due to user interaction (e.g., changing a "map" icon to a "list" icon, providing camera controls when a camera is selected, etc.).

The synchronization module 2080 handles the synchronization of an image capture device's internal clock with the clock of the computer. The synchronization module 2080 of some embodiments performs the difference calculation to identify a time difference and issues the initial commands to modify the metadata and the device clock. As described below, the modifications to the timestamps on the device and the device clock must go through the image capture engine. In some embodiments, the synchronization module is part of the image editor 2050.

The frameworks 2010 and 2020 receive commands that are formatted as calls to APIs 2011 and 2021 from the image viewing application 1911 and perform the operations dictated by those commands. In some embodiments, the Image Capture Core framework 2010 handles commands that involve communication with the image capture devices, and provides information about and from the image capture devices to the image viewing application 1911. That is, the frame The APIs 2011 provide an interface through which the image capture connection module 2030 can make calls to the Image Capture Core framework 2010 in order to request such information and have tasks related to such information performed. As shown in FIG. 20, in some embodiments the Image Capture Core framework 2010 communicates with the Image Capture Extension 1814.

In some embodiments, the Image Capture Core framework 2010 also provides a communication path that allows framework 2020 to communicate with Image Capture Extension 1814. The Image Kit framework 2020 handles commands that supply prearranged layouts (i.e., predefined GUI areas) for placement in the GUI of the image viewing application 1911. In some embodiments, the prearranged layouts include graphical elements and predefined interfaces to allow the placement of data from the Image Capture Core framework 2010 in the prearranged layout. For example, a prearranged layout might include a GUI display area for displaying image capture devices and interfaces that place icons in the display area (e.g., icons representing cameras identified through the Image Capture Core framework 2010). These GUI areas and functions associated with them are accessed by the image capture connection module 2030 through calls to the APIs 2021. Image storage 2015 stores image data received from cameras. In some embodiments, this data is used to populate the GUI areas supplied by Image Kit framework 2020. In some embodiments, a call to an API of framework 2010 or 2020 can result in further calls from framework 2010 or 2020 to APIs in the other of the two frameworks or to Image Capture Extension 1814.

The operations of an import data API will now be described by reference to the modules shown in FIG. 20. Some embodiments provide an API for metadata adjusting and image importing operations described in sections I-III. When a user directs the image viewing application 1911 to import data from an image capture device (e.g., by clicking on an item in the GUI provided by GUI control module 2070), a chain of commands passes through the various modules. Specifically, in some embodiments, a command (in some embodiments, using a command format unique to the image viewing application 1911) passes from (1) the GUI control module 2070, to (2) the viewer coordinator 2040, to (3) the image capture connection module 2030. The image capture connection module 2030 then uses a call to an import API to command the Image Kit framework 2020 to import the selected image(s).

The Image Kit framework 2020, using a command format of the image capture engine, passes the command to import images along another chain. The command is passed to (1) the Image Capture Core framework 2010, to (2) the Image Capture Extension 1814, to (3) the device module 1816, and finally to (4) the camera 1826. The camera then sends the image file and/or metadata to (1) the device module 1816, to (2) the Image Capture Extension 1814, to (3) the Image Capture Core framework 2010, to (4) the Image Kit framework 2020, to (5) the image storage 2015. The Image Kit framework 2020 then sends the imported image and/or metadata about the imported image (e.g., a thumbnail, location information, timestamps, etc.) to the image capture connection module 2030 as a return of the API call. The image capture connection module 2030 passes the data to the viewer coordinator 2040, which passes the image file on to the appropriate module of the image viewing application 1911. For example, the image file can be passed to the image converter 2060 to be saved and/or converted to a specified format. Alternatively, the data can be passed to an image editor 2050 so that the user can edit the imported image before saving it (with the image converter 2060). In some embodiments, the Image Kit framework does not save the image to an image storage 2015, and the image is instead stored elsewhere and/or by other modules.

The APIs allow the image viewing application 1911 to command the camera without having any information about any of the modules further down the chain. Similarly, some embodiments supply other APIs that the image viewing application 1911 can use to command the image capture engine to perform various operations. One of ordinary skill in the art will realize that the modules 2030-2080 are one example of a set of modules of an application that uses the APIs of some embodiments. Furthermore, one of ordinary skill in the art will realize that other applications with fewer, more, or different modules than modules 2030-2080 still remain within the scope of the present invention.

Some embodiments provide an API (or a set of APIs) that commands the Image Kit framework 2020 to supply the GUI control module 2070 with a camera control area. Some embodiments provide an API that commands the Image Kit framework 2020 to supply the GUI control module 2070 with a single window that simultaneously displays a device selection area and a camera control area. Some embodiments provide an API that commands the Image Kit framework 2020 to supply the GUI control module 2070 with a single window that simultaneously displays a device selection area, a camera control area, and a scan display area.

Some embodiments provide an API that commands the Image Capture Core framework 2010 to connect to cameras and retrieve information about the cameras. In some embodiments, the API deals with or represents a connected image capture camera. The API allows an application to receive identifications of camera properties (e.g., capability to delete images, ability to synchronize clocks, ability to take pictures). In some embodiments, such an API also allows an application to retrieve the content of a camera. The API of some embodiments allows an application to get names of items stored on the camera. The API of some embodiments talks to the device extension and carries the names of folders and files on the camera to other modules.

FIG. 20 illustrates the frameworks and their associated APIs as software modules that are not part of any other applications. However, in some embodiments, these frameworks and their associated APIs are part of one image capture utility program that can perform the above-described image capture operations on its own, or can make available its frameworks and engines to other applications through the frameworks' APIs. As described above by reference to FIG. 20, these other applications can use such APIs to provide image capture functionality to the other applications. In some embodiments, a third party application may be executed along with the frameworks as part of a single process in an operating system. In some embodiments, a particular version of frameworks that are used by an application may be installed on a computer along with that application, rather than being present as part of the operating system.

V. Process for Defining an Image Capture Application

Figure 21:
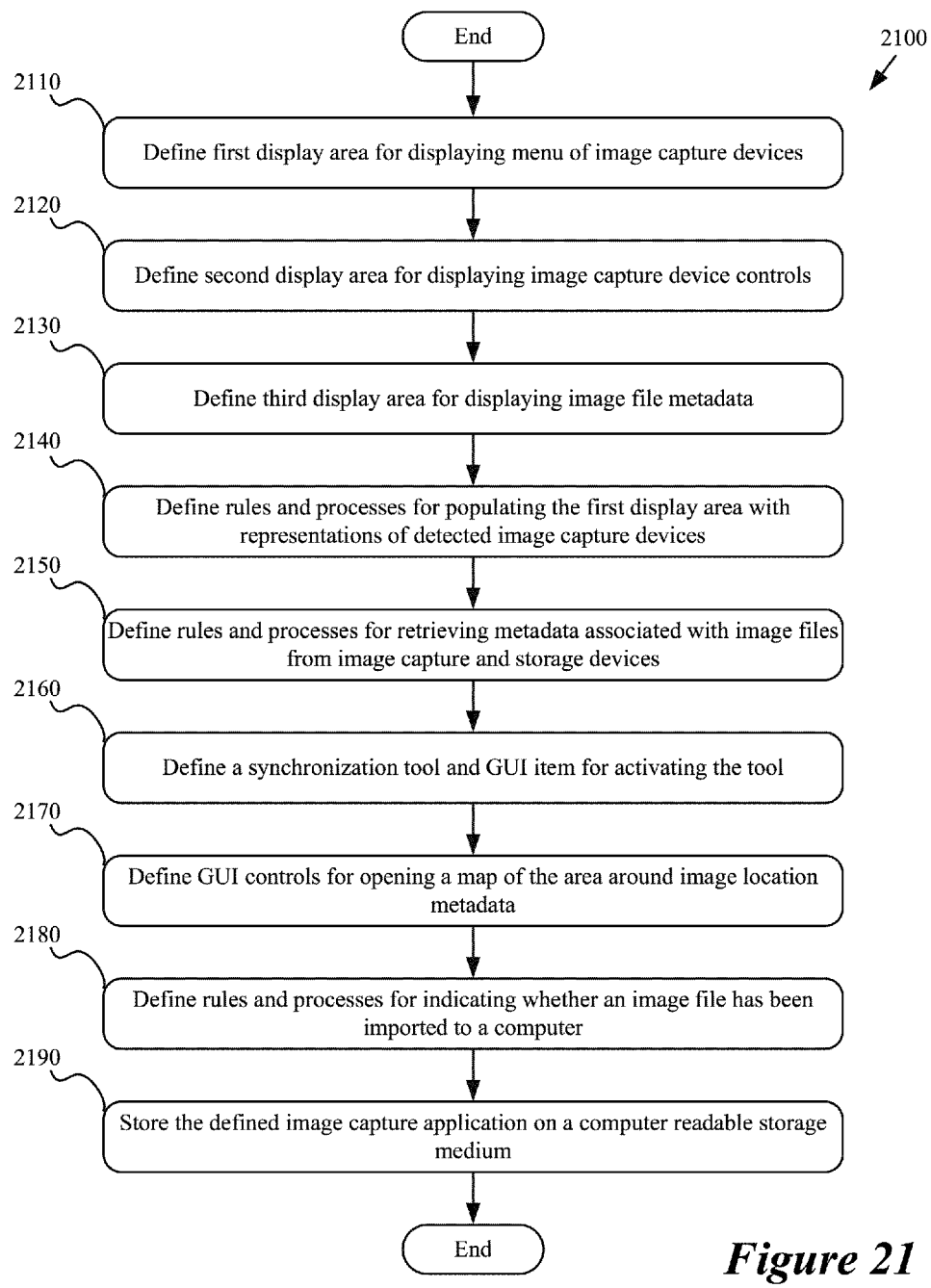
FIG. 21 conceptually illustrates a process of some embodiments for defining and storing an image capture application of some embodiments.

FIG. 21 conceptually illustrates a process 2100 of some embodiments for defining and storing an image capture application of some embodiments, such as image capture client 1812 or image viewing application 1911. Specifically, the process 2100 illustrates the operations used to define sets of instructions for providing some of the GUI elements described in the above sections and for performing various image and metadata capture and manipulation operations described above.

As shown, the process 2100 begins by defining (at 2110) a first display area for displaying a menu of image capture devices, such as the device display area 405 of FIG. 4. Next, the process defines (at 2120) a second display area for displaying image capture device controls, such as camera control area 410. The process then defines (at 2130) a third display area for displaying image file metadata. An example of such a display area is image display area 420.

Next, the process 2100 defines (at 2140) rules and processes for populating the first display area with representations of detected image capture devices and defines (at 2150) rules and processes for retrieving metadata associated with image files from image capture and storage devices. In some embodiments, these rules and processes include calls to one or more image capture APIs, such as APIs 2011 and 2021 of FIG. 20.

The process 2100 then defines (at 2160) a synchronization tool and GUI item for activating the tool. An example of such a GUI item is item 418. The process then defines (at 2170) GUI controls for opening a map of an area around image location metadata, such as the GUI item 1428. The process then defines (at 2180) rules and processes for indicating whether an image file has been imported to a computer. The process 1000 is an example of such a process.

The process 2100 then stores (at 2190) the defined image capture application (i.e., the defined modules and/or APIs, modules, GUI items, etc.) on a computer readable storage medium. In some embodiments, the medium is one or more of a solid-state device, a hard disk, a CD-ROM, or other non-volatile computer readable storage medium.

One of ordinary skill in the art will recognize that the various elements defined by process 2100 are not exhaustive of the modules, rules, processes, and GUI items that could be defined and stored on a computer readable storage medium for an image capture application incorporating some embodiments of the invention. In addition, the process 2100 is a conceptual process, and the actual implementations may vary. For example, different embodiments may define the various elements in a different order, may define several elements in one operation, may decompose the definition of a single element into multiple operations, etc. In addition, the process 2100 may be implemented as several sub-processes or combined with other operations within a macro-process.

One of ordinary skill in the art will realize that although the features of various embodiments are described separately, some embodiments may combine multiple features in the same embodiment. For example, some embodiments provide both synchronization tools and checkmark indicators of imported images; other embodiments provide synchronization tools and geographical plotting tools, etc.

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 22:
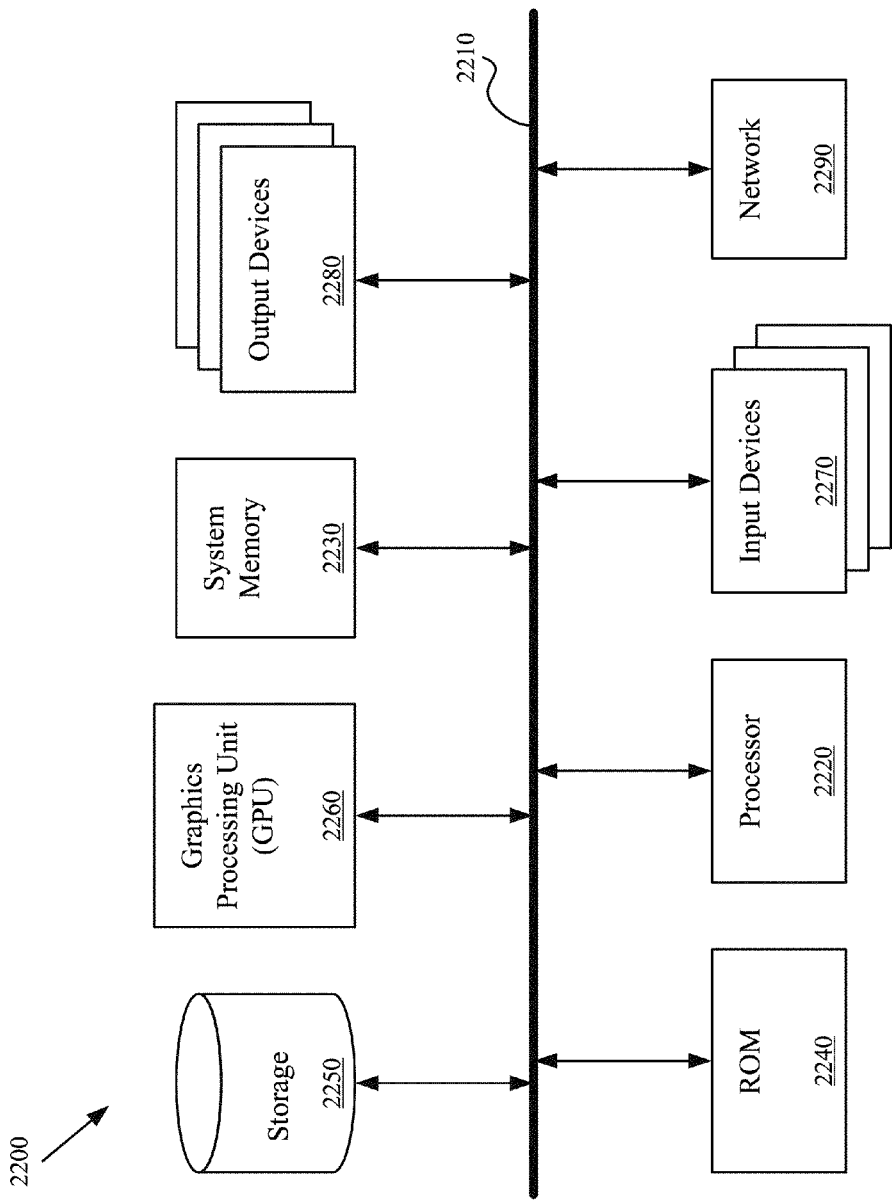
FIG. 22 conceptually illustrates an electronic system with which some embodiments of the invention are implemented.

FIG. 22 conceptually illustrates an electronic system 2200 with which some embodiments of the invention are implemented. The electronic system 2200 may be a computer, phone, PDA, or any other sort of electronic device. Such an electronic system includes various types of computer readable media and interfaces for various other types of computer readable media. Electronic system 2200 includes a bus 2205, processing unit(s) 2210, a graphics processing unit (GPU) 2220, a system memory 2225, a read-only memory 2230, a permanent storage device 2235, input devices 2240, and output devices 2245.

The bus 2205 collectively represents all system, peripheral, and chipset buses that communicatively connect the numerous internal devices of the electronic system 2200. For instance, the bus 2205 communicatively connects the processing unit(s) 2210 with the read-only memory 2230, the GPU 2220, the system memory 2225, and the permanent storage device 2235.

From these various memory units, the processing unit(s) 2210 retrieve instructions to execute and data to process in order to execute the processes of the invention. The processing unit(s) may be a single processor or a multi-core processor in different embodiments. Some instructions are passed to and executed by the GPU 2220. The GPU 2220 can offload various computations or complement the image processing provided by the processing unit(s) 2210. In some embodiments, such functionality can be provided using CoreImage's kernel shading language.

The read-only-memory (ROM) 2230 stores static data and instructions that are needed by the processing unit(s) 2210 and other modules of the electronic system. The permanent storage device 2235, on the other hand, is a read-and-write memory device. This device is a non-volatile memory unit that stores instructions and data even when the electronic system 2200 is off. Some embodiments of the invention use a mass-storage device (such as a magnetic or optical disk and its corresponding disk drive) as the permanent storage device 2235.

Other embodiments use a removable storage device (such as a floppy disk, flash drive, or ZIP® disk, and its corresponding disk drive) as the permanent storage device. Like the permanent storage device 2235, the system memory 2225 is a read-and-write memory device. However, unlike storage device 2235, the system memory is a volatile read-and-write memory, such a random access memory. The system memory stores some of the instructions and data that the processor needs at runtime. In some embodiments, the invention's processes are stored in the system memory 2225, the permanent storage device 2235, and/or the read-only memory 2230. For example, the various memory units include instructions for processing multimedia items in accordance with some embodiments. From these various memory units, the processing unit(s) 2210 retrieve instructions to execute and data to process in order to execute the processes of some embodiments.

The bus 2205 also connects to the input and output devices 2240 and 2245. The input devices enable the user to communicate information and select commands to the electronic system. The input devices 2240 include alphanumeric keyboards and pointing devices (also called "cursor control devices"). The output devices 2245 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 22, bus 2205 also couples electronic system 2200 to a network 2265 through a network adapter (not shown). In this manner, the computer can be a part of a network of computers (such as a local area network ("LAN"), a wide area network ("WAN"), or an Intranet, or a network of networks, such as the internet. Any or all components of electronic system 2200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to processors (e.g., single processors or multi-core processors) that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, although the GUIs illustrated herein are shown with particular areas displaying particular features of the image capture application, one of ordinary skill in the art will recognize that the various display areas and controls may be provided differently in different embodiments. Furthermore, controls may be displayed in different locations of a display area, window, or screen when different devices are selected. For example, some embodiments display scanner controls on the right side of a GUI when a scanner is selected but display camera controls across the bottom of the GUI when a camera is selected.

In some instances of the discussion herein, displays of data are referred to as the data itself. For instance, the actual timestamp of an image file is a stored set of data, while the GUI displays a representation of that timestamp data as a date and time in a standard human-readable format. One of ordinary skill in the art will recognize that modifying the timestamp refers in fact to both the modification of the display of the timestamp and the modification of the stored data as well.

In addition, a number of the figures (including FIGS. 3, 7, 10, 13, 16, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

We claim:

1. A non-transitory computer readable medium storing an application for execution on a first device, the application for displaying a plurality of media content stored on a second device communicably connected to said first device, the application comprising a graphical user interface ("GUI"), the GUI comprising:
 a media content display area for displaying the media content stored on the second device along with temporal metadata indicating a time at which media content was captured; and
 a control area displaying i) a current time according to the first device ii) an internal time of the second device iii) a temporal discrepancy between the first device and second device; the control area further includes:
 a selectable item for activating a synchronization feature that automatically modifies a clock of the second device to match a clock of the first device and that modifies the temporal metadata of the media content on the second device by determining that a first temporal metadata value associated with a first image file has a time earlier than the internal time of the second device;
 identifying a temporal offset based on the temporal discrepancy; and
 modifying the temporal metadata when the sum of the temporal offset and the first temporal metadata does not exceed the current time of the first device clock.

2. The computer readable medium of claim 1, wherein the temporal metadata comprises timestamps.

3. The computer readable medium of claim 2, wherein the synchronization feature further modifies the displayed timestamps in accordance with the modification to the clock of the second device.

4. The computer readable medium of claim 3, wherein the modification to the clock of the second device and the modification to the timestamps each comprise an equal amount of time.

5. The computer readable medium of claim 1, wherein the GUI further comprises a display area for displaying a plurality of selectable items that represent a plurality of devices including the second device.

6. The computer readable medium of claim 5, wherein the second device is directly connected to the first device and the plurality of selectable devices includes a third device that is connected to a network to which the first device is connected.

7. The computer readable medium of claim 1, wherein the media content is not transferred to the first device.

8. The computer readable medium of claim 1, wherein the media content comprises location metadata.

9. The computer readable medium of claim 1, wherein the media content comprises thumbnails of image files.

10. The computer readable medium of claim 1, wherein the GUI further comprises a controls display area for displaying the selectable item for activating the synchronization feature.

11. The computer readable medium of claim 10, wherein the controls display area is further for displaying a time of the clock of the second device.

12. A non-transitory computer readable medium storing a computer program which when executed by at least one processor of a first device synchronizes a second device with the first device, the computer program comprising sets of instructions for:
 receiving a user selection of a selectable item representing the second device;
 displaying metadata retrieved from the second device, the metadata comprising temporal data indicating times at which image files stored on the second device were captured by the second device according to a clock of the second device;
 displaying a control area with a current time according to the first device, an internal time of the second device, a temporal discrepancy between the first device and second device, and a synchronization tool;
 receiving a user selection of a synchronization tool;
 determining that a first temporal metadata value associated with a first image file has a time earlier than the internal time of the second device, identifying a temporal offset based on the temporal discrepancy;
 identifying a temporal offset based on the temporal discrepancy;
 modifying the clock of the second device to resolve a temporal discrepancy between the second device clock and a first device clock when the sum of the temporal offset and the first temporal metadata does not exceed the current time of the first device clock;
 modifying the retrieved temporal metadata in accordance with the modification to the second device clock; and
 causing the second device to modify the temporal data of one or more of the image files on the second device based on the temporal discrepancy.

13. The non-transitory computer readable medium of claim 12, wherein the modification to the temporal metadata modifies the retrieved metadata.

14. The non-transitory computer readable medium of claim 12, wherein the computer program further comprises a set of instructions for displaying a time and date of the clock of the second device.

15. The non-transitory computer readable medium of claim 12, wherein the set of instructions for modifying the clock comprises a call to an application programming interface of an operating system of the first device.

16. The non-transitory computer readable medium of claim 12, wherein the first device is a computer and the second device is a digital camera.

17. The non-transitory computer readable medium of claim 12, wherein the set of instructions for modifying the temporal metadata comprises sets of instructions for:

identifying whether a first temporal metadata of a first image file has a time earlier than a time of the second device clock prior to the modification of the second device clock; and only when the first temporal metadata has a time earlier than the time of the second device clock, modifying the temporal metadata.

18. The non-transitory computer readable medium of claim 17, wherein the first temporal metadata is not modified when the time of the first temporal metadata is not earlier than the time of the second device clock.

* * * * *